(12) United States Patent
Zhao et al.

(10) Patent No.: US 8,531,947 B2
(45) Date of Patent: Sep. 10, 2013

(54) SINGLE AND DUAL INTERNET PROTOCOL BEARER SUPPORT

(75) Inventors: Suli Zhao, San Diego, CA (US); Ajith Tom Payyappilly, San Diego, CA (US); Srinivasan Balasubramanian, San Diego, CA (US); Uppinder Singh Babbar, San Diego, CA (US); Vinay Paradkar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 333 days.

(21) Appl. No.: 13/072,500

(22) Filed: Mar. 25, 2011

(65) Prior Publication Data

US 2011/0242975 A1  Oct. 6, 2011

Related U.S. Application Data

(60) Provisional application No. 61/319,750, filed on Mar. 31, 2010.

(51) Int. Cl.
*H04W 24/00* (2009.01)
*H04W 4/00* (2009.01)
*H04W 36/14* (2009.01)

(52) U.S. Cl.
USPC ............ 370/230; 370/338; 370/331; 370/252

(58) Field of Classification Search
USPC .................................. 370/230, 331, 338, 252
See application file for complete search history.

(56) References Cited

U.S. PATENT DOCUMENTS

| | | | |
|---|---|---|---|
| 8,385,300 B2 * | 2/2013 | Andreasen et al. | 370/338 |
| 2009/0161601 A1 * | 6/2009 | Dai et al. | 370/328 |
| 2009/0290540 A1 | 11/2009 | Cherian et al. | |
| 2010/0088400 A1 * | 4/2010 | Andreasen et al. | 709/223 |
| 2010/0250715 A1 * | 9/2010 | Shigeta et al. | 709/220 |
| 2010/0309813 A1 * | 12/2010 | Singh et al. | 370/254 |
| 2011/0099227 A1 * | 4/2011 | Walls et al. | 709/204 |

FOREIGN PATENT DOCUMENTS

WO  2009158703 A1  12/2009

OTHER PUBLICATIONS

International Search Report and Written Opinion—PCT/US2011/030819, ISA/EPO—Jul. 4, 2011.
Nokia Siemens Networks et al., "Establish all the Dedicated Bearers in combination with default bearer in Handover Attach or Handover PDN connectivity", 3GPP Draft; S2-091629, 3rd Generation Partnership Project (3GPP), Mobile Competence Centre; 650, Route Des Lucioles; F-06921 Sophia-Antipolis Cedex; France, no. Budapest; 20090220, Feb. 20, 2009, XP050333894, [retrieved on Feb. 20, 2009.

\* cited by examiner

*Primary Examiner* — Brian D Nguyen
(74) *Attorney, Agent, or Firm* — Kam T. Tam

(57) ABSTRACT

An apparatus operable in a communication system and having the capability to discard an internet protocol address is described. The apparatus is configured to receive an assignment of a first internet protocol address of a first type for a first application and a second internet protocol address of a second type for a second application for a data connection to a network. The apparatus is also configured to determine that the apparatus is currently not able to handle both the first internet protocol address and the second internet protocol address. The apparatus is further configured to determine an internet protocol address to discard, and discard the determined internet protocol address.

116 Claims, 11 Drawing Sheets

__US 8,531,947 B2__

SINGLE AND DUAL INTERNET PROTOCOL BEARER SUPPORT

CROSS-REFERENCE TO RELATED APPLICATIONS

This application is related to and claims priority from U.S. Provisional Application Ser. No. 61/319,750, filed Mar. 31, 2010, entitled "Single and Dual IP Bearer Support across eHRPD and LTE," which is incorporated herein by reference.

TECHNICAL FIELD

The present disclosure relates generally to electronic communications. More specifically, the present disclosure relates to systems and methods for single and dual IP bearer support.

BACKGROUND

Advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform functions faster, more efficiently or with higher quality are often sought after.

Some electronic devices (e.g., cellular phones, smartphones, computers, etc.) communicate with other electronic devices. For example, a wireless communication device (e.g., cellular phone, smartphone, etc.) may wirelessly communicate with a base station and vice-versa. This may enable the wireless communication device to access and/or communicate voice, video, data and so on.

Some electronic devices are capable of communicating using multiple different technologies. These electronic devices may switch the technology used when another technology becomes available (such as from a different base station) or when circumstances warrant a switch (such as a need for a higher data transfer rate). These electronic devices may need to adjust communication settings that are used when such a switch occurs. As can be seen from this discussion, systems and methods that improve the switching capabilities of the electronic devices may be beneficial.

DETAILED DESCRIPTION

Figure 1:
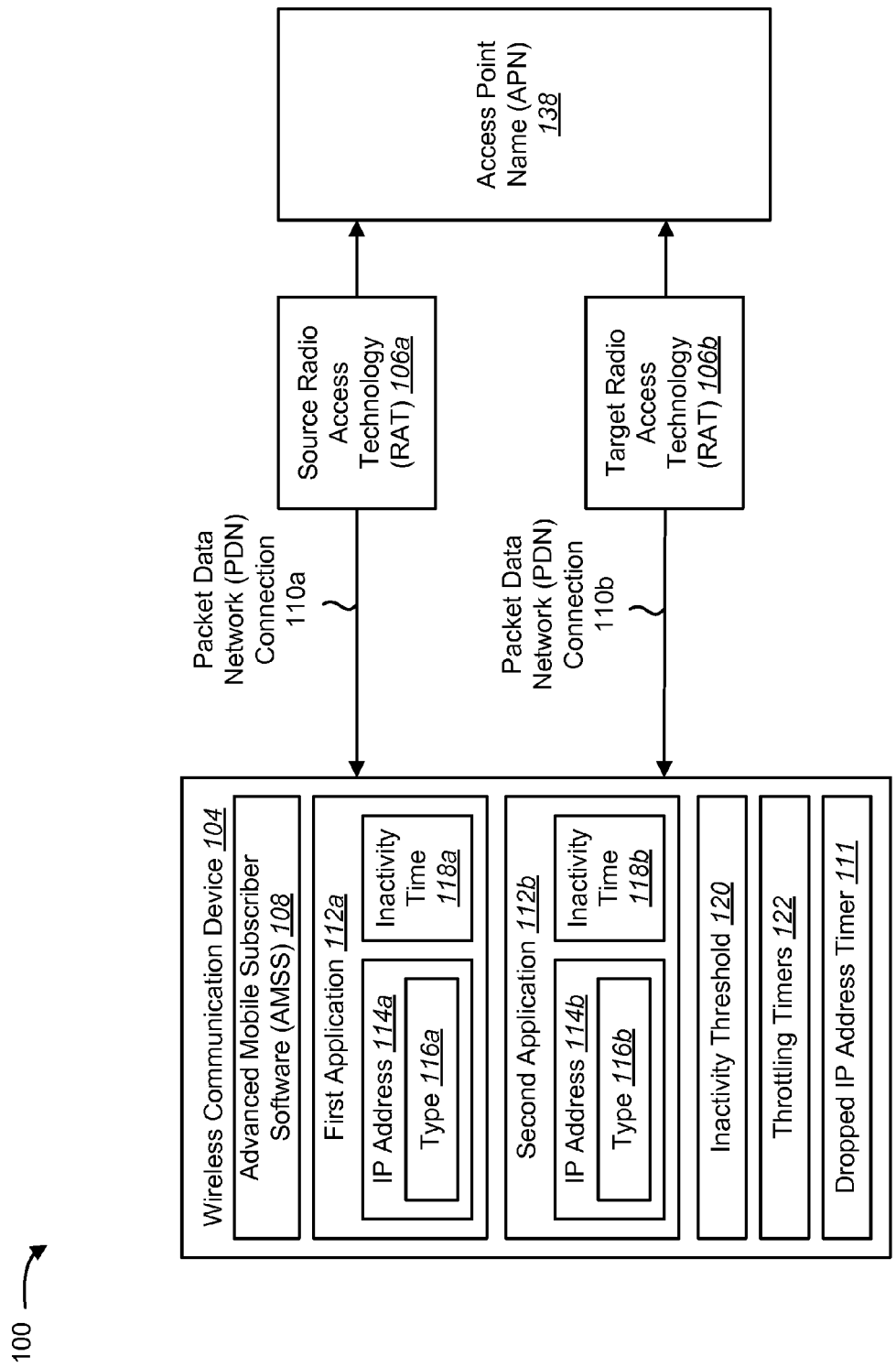
FIG. 1 is a block diagram illustrating one configuration of a wireless communication system.

The systems and methods disclosed herein describe a wireless communication device that discards an IP address. The wireless communication device may establish multiple data connections with a network. For each data connection, the network may assign a first IP address of a first type (for example IPv4) and a second IP address of a second type (for example IPv6). The first IP address may be assigned to a first application that requires the particular data connection and is capable of handling the first IP type and the second IP address may be assigned to a second application that requires the same data connection and is capable of handling the second IP type. The wireless communication device may determine that it can not support one of the IP types at all or that it can not support both IP types simultaneously on a single data connection. Therefore, one of the IP addresses must be discarded. For example, the wireless communication device may move from Long Term Evolution (LTE) to evolved High Rate Packet Data (eHRPD) and be unable to support multiple IP addresses in evolved High Rate Packet Data (eHRPD). A Long Term Evolution (LTE) wireless communication device and an evolved High Rate Packet Data (eHRPD) wireless communication device will be able to support more than one IP address if they are associated with different Packet Data Network (PDN) connections. The wireless communication device may determine which IP address to discard (and thus which IP address to retain). The wireless communication device may then discard the IP address that it has determined to discard. This allows the wireless communication device to keep the appropriate IP address and avoid ambiguity.

In the following description, for reasons of conciseness and clarity, terminology associated with the LTE standards, as promulgated under the 3rd Generation Partnership Project (3GPP) by the International Telecommunication Union (ITU), is used. It should be noted that the invention is also applicable to other technologies, such as technologies and the associated standards related to Code Division Multiple Access (CDMA), Time Division Multiple Access (TDMA), Frequency Division Multiple Access (FDMA), Orthogonal Frequency Division Multiple Access (OFDMA) and so forth. Terminologies associated with different technologies can vary. For example, depending on the technology considered, a wireless device can sometimes be called a user equipment (UE), a mobile station, a mobile terminal, a subscriber unit, an access terminal, etc., to name just a few. Likewise, a base station can sometimes be called an access point, a Node B, an evolved Node B (eNB), and so forth. It should be noted that different terminologies apply to different technologies when applicable.

The $3^{rd}$ Generation Partnership Project (3GPP) is a collaboration between groups of telecommunications associations that aims to define a globally applicable $3^{rd}$ generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems and mobile devices. In 3GPP Long Term Evolution (LTE), a mobile station or device may be referred to as a "user equipment" (UE).

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of a wireless communication system 100. Wireless communication systems 100 are widely deployed to provide various types of communication content such as voice, data and so on. Communications in a wireless system (e.g., a multiple-access system) may be achieved through transmissions over a wireless link. Such a communication link may be established via a single-input and single-output (SISO), multiple-input and single-output (MISO) or a multiple-input and multiple-output (MIMO) system. A MIMO system includes transmitter(s) and receiver(s) equipped, respectively, with multiple (NT) transmit antennas and multiple (NR) receive antennas for data transmission. SISO and MISO systems are particular instances of a MIMO system. The MIMO system can provide improved performance (e.g., higher throughput, greater capacity or improved reliability) if the additional dimensionalities created by the multiple transmit and receive antennas are utilized.

The wireless communication system 100 may utilize MIMO. A MIMO system may support both time division duplex (TDD) and frequency division duplex (FDD) systems. In a TDD system, uplink and downlink transmissions are on the same frequency region so that the reciprocity principle allows the estimation of the downlink channel from the uplink channel. This enables a transmitting wireless device to extract transmit beamforming gain from communications received by the transmitting wireless device.

The wireless communication system 100 may be a multiple-access system capable of supporting communication with multiple wireless communication devices 104 by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, $3^{rd}$ Generation Partnership Project (3GPP) Long Term Evolution (LTE) systems and spatial division multiple access (SDMA) systems.

The terms "networks" and "systems" are often used interchangeably. A CDMA network may implement a radio technology such as Universal Terrestrial Radio Access (UTRA), cdma2000, etc. UTRA includes W-CDMA and Low Chip Rate (LCR) while cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA and GSM are part of Universal Mobile Telecommunication System (UMTS). Long Term Evolution (LTE) is a release of UMTS that uses E-UTRA. UTRA, E-UTRA, GSM, UMTS and Long Term Evolution (LTE) are described in documents from an organization named "3rd Generation Partnership Project" (3GPP). cdma2000 is described in documents from an organization named "3rd Generation Partnership Project 2" (3GPP2). For clarity, certain aspects of the techniques are described below for Long Term Evolution (LTE) while other aspects are described below for evolved high rate packet data (eHRPD), and both Long Term Evolution (LTE) terminology and evolved high rate packet data (eHRPD) terminology are used in the description below.

The wireless communication system 100 may include a wireless communication device 104. The wireless communication device 104 may be referred to as, and may include some or all of the functionality of, a terminal, an access terminal (AT), a user equipment (UE), a subscriber unit, a station, etc. In general, a wireless communication device 104 that is capable of connecting to an Enhanced Packet Core (EPC) network (i.e., a core network that supports the evolved high rate packet data (eHRPD) and Long Term Evolution (LTE) technologies) may be referred to as either a user equipment (UE) or an enhanced access terminal (eAT). A wireless communication device 104 that is only capable of connecting to legacy 3GPP2 networks such as 1× or high rate packet data (HRPD), and is not capable of connection to the Enhanced Packet Core (EPC) network may be referred to as an access terminal (AT). A user equipment (UE) may also be capable of connecting to legacy 1x/HRPD networks. As used herein, the term wireless communication device 104 refers to either a user equipment (UE) or an enhanced access terminal (eAT).

With respect to Enhanced Packet Core (EPC) technologies, a wireless communication device 104 may be one of three types: an evolved high rate packet data (eHRPD) only device, a Long Term Evolution (LTE) only device or an evolved high rate packet data (eHRPD) and Long Term Evolution (LTE) device. A wireless communication device 104 may have the ability to obtain services from an access point name (APN) 138 via different radio access technologies (RATs) 106a-b. A wireless communication device 104 may obtain services from multiple access point names (APNs) 138. A wireless communication device 104 may switch from a source radio access technology (RAT) 106a to a target radio access technology (RAT) 106b while maintaining an IP connection with an access point name (APN) 138.

The wireless communication device 104 may include an Advanced Mobile Subscriber Software (AMSS) 108. The Advanced Mobile Subscriber Software (AMSS) 108 refers to the system software running on the wireless communication device 104, including operating systems, data and network protocol stacks for all supported technologies, device drivers and control software to setup and manage voice and data calls. The Advanced Mobile Subscriber Software (AMSS) 108 may assist an application 112a-b in setting up and maintaining a data call with a network access system. An Advanced Mobile Subscriber Software (AMSS) 108 may also inform an application 112 when a packet data call has failed.

The wireless communication device 104 may include a first application 112a and a second application 112b. An application 112 on the wireless communication device 104 may trigger the Advanced Mobile Subscriber Software (AMSS) 108 to originate a packet data call (referred to herein as a Packet Data Network (PDN) connection 110a-b) with an access point name (APN) 138 using the current radio access technology (RAT) 106. Upon setting up the Packet Data Network (PDN) connection 110, the network may assign an IP address 114a-b to the wireless communication device 104. The wireless communication device 104 may then grant the IP address 114 to applications that need connectivity using that Packet Data Network (PDN) connection 110 and IP type 116. Each IP address 114 may have an IP address type 116a-b. For example, an IP address 114 may have a type 116a-b of IPv4 or IPv6. The network does not know which IP type 116 the application 112 wants. Multiple applications 112 that want to use a Packet Data Network (PDN) connection 110 and want a particular IP type 116 can share the IP address 114 with that IP type 116. As an example, two applications 112 that want IPv4 can share the IPv4 address on the Packet Data Network (PDN) connection 110 (this also applies for an IPv6 address).

Depending on the capability of and type of services requested by the wireless communication device 104 and the capability of and type of services offered by the access point name (APN) 138, a wireless communication device 104 may be assigned either one IP address 114 or two IP addresses 114. In cases where the wireless communication device 104 is assigned only one IP address 114, the type 116 of the IP address 114 may be either IPv4 or IPv6. In cases where the wireless communication device 104 is assigned two IP addresses 114, one of the IP addresses 114 is an IPv4 address and one of the IP addresses 114 is an IPv6 address.

A wireless communication device 104 may be capable of IPv4 only, IPv6 only or a dual-IP stack (both IPv4 and IPv6) such that the wireless communication device 104 as a whole has both IPv4 capability and IPv6 capability. The wireless communication device 104 may indicate to the network what the capabilities of the wireless communication device 104 are (i.e., IPv4 only, IPv6 only or dual-IP stack). The network may then indicate to the wireless communication device 104 what the network wants the wireless communication device 104 to actually use. This can be IPv4 only, IPv6 only, or both IPv4 and IPv6. If it is IPv4 only, a single IPv4 address may be assigned to the wireless communication device 104 for the Packet Data Network (PDN) connection 110. If it is IPv6 only, a single IPv6 address may be assigned to the wireless communication device 104 for the Packet Data Network (PDN) connection 110. If it is both IPv4 and IPv6, two IP addresses 114 may be assigned to the wireless communication device 104: an IPv4 address and an IPv6 address.

A Packet Data Network (PDN) connection 110 established with only one IP address 114 assigned to the wireless communication device 104 (either IPv4 only or IPv6 only but not both) may be referred to as a single IP bearer. A Packet Data Network (PDN) connection 110 established with two IP addresses 114 (both an IPv4 address and an IPv6 address) may be referred to as a dual-IP bearer. Thus, dual-IP bearer refers to a Packet Data Network (PDN) connection 110 established with two IP addresses 114 while dual-IP stack refers to the capability of the wireless communication device 104 to handle both IPv4 addresses and IPv6 addresses. Although the wireless communication device 104 can indicate to the network what the wireless communication device 104 is capable of in reference to a particular Packet Data Network (PDN) connection 110, the wireless communication device 104 can not indicate to the network what the wireless communication device 104 actually wants for the particular Packet Data Network (PDN) connection 110 (e.g., what an application 112 that is trying to connect to the particular access point name (APN) 138 wants).

As described herein, the wireless communication device 104 is capable of dual-IP stack. A particular application 112 that is trying to connect to an access point name (APN) 138 may only be capable of using IPv4. If the access point name (APN) 138 is capable of connecting using IPv4 only, there is no problem. The access point name (APN) 138 may assign only an IPv4 address to the wireless communication device 104 for the Packet Data Network (PDN) connection 110 used by the requesting application 112. If the access point name (APN) 138 is capable of IPv6 only, there is no ambiguity. The access point name (APN) 138 may assign an IPv6 address to the wireless communication device 104 for the Packet Data Network (PDN) connection 110 used by the requesting application 112. Because the Advanced Mobile Subscriber Software (AMSS) 108 knows that the requesting application 112 wants only an IPv4 address (and cannot use the assigned IPv6 address), there is no use having the IPv6 address (assuming there are no other applications 112 that want to use this access point name (APN) 138) and the Advanced Mobile Subscriber Software (AMSS) 108 releases the IPv6 address.

However, an ambiguity does arise when the access point name (APN) 138 is capable of both IPv4 and IPv6. In these cases, the network cannot be sure what type 116 of IP address 114 to assign for the Packet Data Network (PDN) connection 110 because the wireless communication device 104 has indicated it is capable of supporting both IPv4 and IPv6 for the Packet Data Network (PDN) connection 110. The only safe option for the network is to assign both an IPv4 address and an IPv6 address to the wireless communication device 104. The combinations for wireless communication device 104 IP address 114 capabilities, application 112 IP address 114 capabilities and corresponding network assignments are summarized in Table 1.

TABLE 1

| AMSS IP Capability | Application IP capability | Network assignments | | |
|---|---|---|---|---|
| | | v4 only | v6 only | v4 and v6 |
| v4 only | v4 | v4 | X | X |
| v4 only | v6 | X | X | X |
| v6 only | v4 | X | X | X |
| v6 only | v6 | X | v6 | X |
| v4 and v6 (dual IP stack capable) | v4 | v4 | ? | ? |
| v4 and v6 (dual IP stack capable) | v6 | ? | v6 | ? |

For simplicity, Table 1 only considers one application 112 per Packet Data Network (PDN) connection 110. The cells that are marked with an "X" are invalid, but there is no ambiguity. For example, a v4 only wireless communication device 104 (i.e., an Advanced Mobile Subscriber Software (AMSS) 108 with IP address 114 capability of v4 only) will not have a v6 application 112; the Advanced Mobile Subscriber Software (AMSS) 108 would immediately signal an error. If a wireless communication device 104 indicates that it is capable of v4 only, but the network assigns it a v6 address, it is also invalid. Even if the network does assign such an invalid address, the wireless communication device 104 would just indicate an error and tear down the Packet Data Network (PDN) connection 110 since it can't handle the Packet Data Network (PDN) connection 110 with an IPv6 address. The cells marked with a "?" are those cells that present the problems (or ambiguities) solved herein.

Some wireless communication devices 104 are only capable of single IP bearer even though the wireless communication device 104 is dual-IP stack capable. In other words, the Advanced Mobile Subscriber Software (AMSS) 108 may be capable of supporting both IPv4 and IPv6 on evolved High Rate Packet Data (eHRPD) for the wireless communication device 104 as a whole, but only one or the other and not both for each Vendor-Specific Network Control Protocol (VSNCP) instance. In contrast, a wireless communication device 104 that is capable of supporting dual-IP bearer may support both IPv4 and IPv6 at the same time. An added complication is that there may be wireless communication devices 104 that are capable of supporting dual-IP bearer in Long Term Evolution (LTE) but not in evolved High Rate Packet Data (eHRPD).

In Long Term Evolution (LTE), it is allowed for the wireless communication device 104 to have two single IP bearers to the same access point name (APN) 138. Thus, there can be two instances of Packet Data Network (PDN) connections 110, each with a single IP address 114 connected to the same access point name (APN) 138. However, in evolved High Rate Packet Data (eHRPD), this was not allowed in the first few versions of the standard. The latest version of the standard for evolved High Rate Packet Data (eHRPD) does allow this. However, most of the already deployed evolved High Rate Packet Data (eHRPD) networks do not support it because they were implemented based on the initial versions of the standard. The references herein to an evolved High Rate Packet Data (eHRPD) network are those evolved High Rate Packet Data (eHRPD) networks that do not support two single IP bearers to the same access point name (APN) 138 and thus only support one Packet Data Network (PDN) connection 110 to an access point name (APN) 138. A similar problem may occur in a Universal Mobile Telecommunications System (UMTS) if the focus is on network/device capability rather than standards limitations.

The Packet Data Network (PDN) connection 110 can be either single IP bearer or dual-IP bearer. Table 1 above only considered the Advanced Mobile Subscriber Software (AMSS) 108 dual-IP stack capabilities. The combinations for wireless communication device 104 IP address 114 capabilities, application 112 IP address 114 capabilities and corresponding network assignments when the dual-IP bearer capabilities of the wireless communication device 104 are considered in Table 2. A legacy evolved High Rate Packet Data (eHRPD) wireless communication device 104 may not support dual-IP bearer capability, whereas a newer evolved High Rate Packet Data (eHRPD) wireless communication device 104 may support dual-IP bearer.

TABLE 2

| AMSS IP Capability (only dual-IP stack capable is listed here) | Wireless communication device dual-IP bearer capability | Application IP capability | Network assignments | | |
|---|---|---|---|---|---|
| | | | v4 only | v6 only | v4 and v6 |
| v4 and v6 | No  | v4 | v4 | ? | ? |
| v4 and v6 | No  | v6 | ?  | v6 | ? |
| v4 and v6 | Yes | v4 | v4 | ? | ? |
| v4 and v6 | Yes | v6 | ?  | v6 | ? |

The cells marked with a "?" in Table 2 are those cells that present the problems (or ambiguities) solved herein. The next step is to consider a multimedia dual-IP stack capable wireless communication device 104 that supports two radio access technologies (RATs) 106 and transitions between these two technologies. Examples of radio access technologies (RATs) 106 include Long Term Evolution (LTE) and evolved High Rate Packet Data (eHRPD). The various transitions between different technologies are illustrated in Table 3.

TABLE 3

| | | Target RAT assignments | | | |
|---|---|---|---|---|---|
| | | IPv4 | IPv6 | IPv4 & IPv6 Dual IP bearer | IPv4 & IPv6 Two single IP bearers |
| Source RAT assignments | IPv4 | IPv4 Scenario 0 - single | ? Scenario 1 | ? Scenario 2 | ? Scenario 3 |
| | IPv6 | ? Scenario 1 | IPv6 Scenario 0 - single | ? Scenario 2 | ? Scenario 3 |
| | IPv4 & IPv6 Dual IP bearer | ? Scenario 4 | ? Scenario 4 | IPv4 & IPv6 Dual IP bearer Scenario 0 - dual | ? Scenario 5 |
| | IPv4 & IPv6 Two single IP bearers | ? Scenario 4 | ? Scenario 4 | ? Scenario 5 | IPv4 & IPv6 Two single IP bearers Scenario 0 - two |

In Table 3, it is assumed that there are no restrictions on the capabilities of the wireless communication device 104. However, the network may assign IP addresses 114 depending on the operator's network capability with respect to a technology (e.g., evolved High Rate Packet Data (eHRPD) as a technology does not support two single IP bearers to the same access point name (APN) 138), the network capability (e.g., a particular HRPD Serving Gateway (HSGW) vendor may not support dual-IP bearer) or resource considerations (e.g., at a particular time, the network may not have enough IPv4 addresses to give out).

When the source radio access technology (RAT) 106a and the target radio access technology (RAT) 106b assign IP address 114 and IP bearers in exactly the same manner, there is no ambiguity and the wireless communication device 104 does not have to do anything special. These are the diagonal entries in Table 3 that are labeled as Scenario 0. However, the target radio access technology (RAT) 106b may not assign the IP addresses 114 and/or IP bearers to the wireless communication device 104 in the same manner as the source radio access technology (RAT) 106*a*. The cells marked with a "?" are those cells that present the problems (or ambiguities) requiring the wireless communication device 104 to use an algorithm to determine the appropriate action.

The cells in Table 3 that are labeled as Scenario 1 are those occurrences when the target radio access technology (RAT) 106*b* assigns one single IP address 114 to the wireless communication device 104 that is the opposite type 116 of the one single IP address 114 assigned by the source radio access technology (RAT) 106*a*. Scenario 1 is unlikely to happen unless there is some sort of error. However, when Scenario 1 does occur, the wireless communication device 104 must deal with it. The cells in Table 3 that are labeled as Scenario 2 are those occurrences when there was a single IP bearer on the source radio access technology (RAT) 106*a* but the target radio access technology (RAT) 106*b* assigns a dual-IP bearer with both IP addresses 114 to the wireless communication device 104.

The cells in Table 3 that are labeled as Scenario 3 are those occurrences when there was a single IP bearer assigned on the source radio access technology (RAT) 106*a* but the target radio access technology (RAT) 106*b* assigns two single IP bearers (one IPv4 address and one IPv6 address) to the wireless communication device 104. The cells in Table 4 that are labeled as Scenario 4 are those occurrences when there were two IP addresses 114 (either over a dual-IP bearer or over two single IP bearers) assigned by the source radio access technology (RAT) 106*a* but the target radio access technology (RAT) 106*b* assigns only one IP address 114. The cells in Table 3 that are labeled as Scenario 5 are those occurrences when both the source radio access technology (RAT) 106*a* and the target radio access technology (RAT) 106*b* assign two IP addresses 114 to the wireless communication device 104 but one of the radio access technologies (RATs) 106 (either the source radio access technology (RAT) 106*a* or the target radio access technology (RAT) 106*b*) uses a single dual-IP address bearer while the other radio access technology (RAT) 106 uses two single IP bearers.

In Table 4, the wireless communication device 104 capabilities of IP stack and IP bearers are considered in addition to the network behavior when the wireless communication device 104 transitions from a source radio access technology (RAT) 106*a* to a target radio access technology (RAT) 106*b*. Table 4 is the general complete table that includes all the possible combinations for a wireless communication device 104 that is transitioning between two radio access technologies (RATs) 106. The cells marked with a "?" are those cells that present the problems (or ambiguities) solved herein. The interesting cases are when one radio access technology (RAT) 106 supports dual-IP bearer and the other does not. For simplicity, in Table 4, it can be assumed that the wireless communication device 104 supports dual-IP bearer in Long Term Evolution (LTE) but may or may not support dual-IP bearer in evolved High Rate Packet Data (eHRPD). The opposite is also possible, but similar principles apply so it is not considered explicitly.

TABLE 4

| AMSS IP Capability (only dual-IP stack capable listed here) | Dual-bearer capability in Source RAT | Dual-bearer capability in Target RAT | Application IP capability | Source RAT had assigned | Target RAT assignments | | | |
|---|---|---|---|---|---|---|---|---|
| | | | | | v4 only | v6 only | v4 and v6 Dual-bearer | v4 and v6 two single bearers |
| v4 and v6 | Yes | Yes | v4 | v4 | v4 | ? | ? | ? |
| v4 and v6 | Yes | Yes | v4 | v6 | X | X | X | X |
| v4 and v6 | Yes | Yes | v4 | v4 and v6 dual-IP bearer | ? | ? | ? | ? |
| v4 and v6 | Yes | Yes | v4 | v4 and v6 two single bearers | ? | ? | ? | ? |
| v4 and v6 | Yes | Yes | v6 | v4 | X | X | X | X |
| v4 and v6 | Yes | Yes | v6 | v6 | ? | v6 | ? | ? |
| v4 and v6 | Yes | Yes | v6 | v4 and v6 dual bearer | ? | ? | ? | ? |
| v4 and v6 | Yes | Yes | v6 | v4 and v6 two single bearers | ? | ? | ? | ? |
| v4 and v6 | Yes | No | v4 | v4 | v4 | ? | ? | ? |
| v4 and v6 | Yes | No | v4 | v6 | X | X | X | X |
| v4 and v6 | Yes | No | v4 | v4 and v6 dual-IP bearer | ? | ? | ? | ? |
| v4 and v6 | Yes | No | v4 | v4 and v6 two single bearers | ? | ? | ? | ? |
| v4 and v6 | Yes | No | v6 | v4 | X | X | X | X |
| v4 and v6 | Yes | No | v6 | v6 | ? | v6 | ? | ? |
| v4 and v6 | Yes | No | v6 | v4 and v6 dual-IP bearer | ? | ? | ? | ? |

TABLE 4-continued

| AMSS IP Capability (only dual-IP stack capable listed here) | Dual-bearer capability in Source RAT | Dual-bearer capability in Target RAT | Application IP capability | Source RAT had assigned | Target RAT assignments | | | |
|---|---|---|---|---|---|---|---|---|
| | | | | | v4 only | v6 only | v4 and v6 Dual-bearer | v4 and v6 two single bearers |
| v4 and v6 | Yes | No | v6 | v4 and v6 two single bearers | ? | ? | ? | ? |

In Table 5, the wireless communication device 104 capabilities of IP stack and IP bearers are considered in addition to the network behavior when the wireless communication device 104 transitions from a Long Term Evolution (LTE) radio access technology (RAT) 106 to an evolved High Rate Packet Data (eHRPD) radio access technology (RAT) 106. Thus, Table 5 is a more specific example of Table 4 above. The cells marked with a "?" in Table 5 are those cells that present the problems (or ambiguities) solved herein.

TABLE 5

| AMSS IP Capability (only dual-IP stack capable listed here) | Wireless Communication Device dual-IP bearer capability in LTE | Wireless Communication Device dual-IP bearer capability in eHRPD | Application IP Capability | LTE RAT had assigned | eHRPD RAT assignments | | |
|---|---|---|---|---|---|---|---|
| | | | | | v4 only | v6 only | v4 and v6 Dual-bearer |
| v4 and v6 | Yes | Yes | v4 | v4 | v4 | ? | ? |
| v4 and v6 | Yes | Yes | v4 | v6 | X | X | X |
| v4 and v6 | Yes | Yes | v4 | v4 and v6 dual-IP bearer | ? | ? | ? |
| v4 and v6 | Yes | Yes | v4 | v4 and v6 two single bearers | ? | ? | ? |
| v4 and v6 | Yes | Yes | v6 | v4 | X | X | X |
| v4 and v6 | Yes | Yes | v6 | v6 | ? | v6 | ? |
| v4 and v6 | Yes | Yes | v6 | v4 and v6 dual bearer | ? | ? | ? |
| v4 and v6 | Yes | Yes | v6 | v4 and v6 two single bearers | ? | ? | ? |
| v4 and v6 | Yes | No | v4 | v4 | v4 | ? | ? |
| v4 and v6 | Yes | No | v4 | v6 | X | X | X |
| v4 and v6 | Yes | No | v4 | v4 and v6 dual-IP bearer | ? | ? | ? |
| v4 and v6 | Yes | No | v4 | v4 and v6 two single bearers | ? | ? | ? |
| v4 and v6 | Yes | No | v6 | v4 | X | X | X |
| v4 and v6 | Yes | No | v6 | v6 | ? | v6 | ? |
| v4 and v6 | Yes | No | v6 | v4 and v6 dual-IP bearer | ? | ? | ? |
| v4 and v6 | Yes | No | v6 | v4 and v6 two single bearers | ? | ? | ? |

In Table 6, the wireless communication device capabilities 104 of IP stack and IP bearers are considered in addition to the network behavior when the wireless communication device 104 transitions from an evolved High Rate Packet Data (eHRPD) radio access technology (RAT) 106 to a Long Term Evolution (LTE) radio access technology (RAT) 106. Thus, Table 6 is a more specific example of Table 4 above. The cells marked with a "?" in Table 6 are those cells that present the problems (or ambiguities) solved herein.

TABLE 6

| AMSS IP Capability (only dual-IP stack capable listed here) | Wireless Communication Device dual-IP bearer capability in LTE | Wireless Communication Device dual-IP bearer capability in eHRPD | Application IP capability | eHRPD RAT had assigned | LTE RAT assignments ||||
|---|---|---|---|---|---|---|---|---|
| | | | | | v4 only | v6 only | v4 and v6 Dual-bearer | v4 and v6 two single bearers |
| v4 and v6 | Yes | Yes | v4 | v4 | v4 | ? | ? | ? |
| v4 and v6 | Yes | Yes | v4 | v6 | X | X | X | X |
| v4 and v6 | Yes | Yes | v4 | v4 and v6 dual-IP bearer | ? | ? | ? | ? |
| v4 and v6 | Yes | Yes | v6 | v4 | X | X | X | X |
| v4 and v6 | Yes | Yes | v6 | v6 | ? | v6 | ? | ? |
| v4 and v6 | Yes | Yes | v6 | v4 and v6 dual bearer | ? | ? | ? | ? |
| v4 and v6 | Yes | No | v4 | v4 | v4 | ? | ? | ? |
| v4 and v6 | Yes | No | v4 | v6 | X | X | X | X |
| v4 and v6 | Yes | No | v4 | v4 and v6 dual-IP bearer | ? | ? | ? | ? |
| v4 and v6 | Yes | No | v6 | v4 | X | X | X | X |
| v4 and v6 | Yes | No | v6 | v6 | ? | v6 | ? | ? |
| v4 and v6 | Yes | No | v6 | v4 and v6 dual-IP bearer | ? | ? | ? | ? |

In Table 7, the case where a wireless communication device 104 moves from a Long Term Evolution (LTE) radio access technology (RAT) 106 to an evolved High Rate Packet Data (eHRPD) radio access technology (RAT) 106 and then back to a Long Term Evolution (LTE) radio access technology (RAT) 106 is considered. Table 7 focuses only on the cases of the network assigning dual IP addresses 114. The cells marked with a "?" in Table 7 are those cells that present the problems (or ambiguities) solved herein.

TABLE 7

| AMSS IP Capability (only dual-IP stack capable listed here) | Wireless Communication Device dual-IP bearer capability In LTE | Wireless Communication Device dual-IP bearer capability in eHRPD | Application IP capability | Original LTE RAT had assigned | Source eHRPD RAT had assigned | Target LTE RAT assigns dual-bearer | Target LTE RAT assigns two single-bearers |
|---|---|---|---|---|---|---|---|
| v4 and v6 | Yes | Yes | v4 | v4 and v6 dual-IP bearer | v4 and v6 dual-IP bearer | ? | ? |
| v4 and v6 | Yes | Yes | v4 | v4 and v6 two single bearers | v4 and v6 dual-IP bearer | ? | ? |

TABLE 7-continued

| AMSS IP Capability (only dual-IP stack capable listed here) | Wireless Communication Device dual-IP bearer capability In LTE | Wireless Communication Device dual-IP bearer capability in eHRPD | Application IP capability | Original LTE RAT had assigned | Source eHRPD RAT had assigned | Target LTE RAT assigns dual-bearer | Target LTE RAT assigns two single-bearers |
|---|---|---|---|---|---|---|---|
| v4 and v6 | Yes | Yes | v6 | v4 and v6 dual bearer | v4 and v6 dual-IP bearer | ? | ? |
| v4 and v6 | Yes | Yes | v6 | v4 and v6 two single bearers | v4 and v6 dual-IP bearer | ? | ? |
| v4 and v6 | Yes | No | v4 | v4 and v6 dual-IP bearer | v4 and v6 dual-IP bearer | ? | ? |
| v4 and v6 | Yes | No | v4 | v4 and v6 two single bearers | v4 and v6 dual-IP bearer | ? | ? |
| v4 and v6 | Yes | No | v6 | v4 and v6 dual-IP bearer | v4 and v6 dual-IP bearer | ? | ? |
| v4 and v6 | Yes | No | v6 | v4 and v6 two single bearers | v4 and v6 dual-IP bearer | ? | ? |

In Table 8, the case where a wireless communication device 104 moves from an evolved High Rate Packet Data (eHRPD) radio access technology (RAT) 106 to a Long Term Evolution (LTE) radio access technology (RAT) 106 and then back to an evolved High Rate Packet Data (eHRPD) radio access technology (RAT) 106 is considered. Table 8 focuses only on the cases of the network assigning dual IP addresses. The cells marked with a "?" in Table 8 are those cells that present the problems (or ambiguities) solved herein.

TABLE 8

| AMSS IP Capability (only dual-IP stack capable listed here) | Wireless Communication Device dual-IP bearer capability In LTE | Wireless Communication Device dual-IP bearer capability in eHRPD | Application IP capability | Original eHRPD RAT had assigned | Source LTE RAT had assigned | Target eHRPD RAT assigns dual-IP bearer |
|---|---|---|---|---|---|---|
| v4 and v6 | Yes | Yes | v4 | v4 and v6 dual-IP bearer | v4 and v6 dual-IP bearer | ? |
| v4 and v6 | Yes | Yes | v4 | v4 and v6 dual-IP bearer | v4 and v6 two single bearers | ? |
| v4 and v6 | Yes | Yes | v6 | v4 and v6 dual-IP bearer | v4 and v6 dual bearer | ? |
| v4 and v6 | Yes | Yes | v6 | v4 and v6 dual-IP bearer | v4 and v6 two single bearers | ? |
| v4 and v6 | Yes | No | v4 | v4 and v6 dual-IP bearer | v4 and v6 dual-IP bearer | ? |
| v4 and v6 | Yes | No | v4 | v4 and v6 dual-IP bearer | v4 and v6 two single bearers | ? |

TABLE 8-continued

| AMSS IP Capability (only dual-IP stack capable listed here) | Wireless Communication Device dual-IP bearer capability In LTE | Wireless Communication Device dual-IP bearer capability in eHRPD | Application IP capability | Original eHRPD RAT had assigned | Source LTE RAT had assigned | Target eHRPD RAT assigns dual-IP bearer |
|---|---|---|---|---|---|---|
| v4 and v6 | Yes | No | v6 | v4 and v6 dual-IP bearer | v4 and v6 dual-IP bearer | ? |
| v4 and v6 | Yes | No | v6 | v4 and v6 dual-IP bearer | v4 and v6 two single bearers | ? |

A strategy is thus needed to deal with IP address 114 assignments when considering varying wireless communication device 104 capabilities, application 112 capabilities and network assignments including technology dependencies. Because the network is not aware of whether a wireless communication device 104 is a legacy device that supports dual-IP stack but not dual-IP bearer, the network does not have a means of finding out what address assignment the wireless communication device 104 actually wants when the wireless communication device 104 tries to setup a Packet Data Network (PDN) connection 110. The systems and methods herein replace the "?" in Tables 1-8 above with algorithms and options in a logical and consistent manner. These systems and methods may be implemented within the wireless communication device 104.

Each application 112 on the wireless communication device 104 may have an inactivity time 118a-b. The inactivity time 118 represents the amount of time since the application 112 last was involved in data transfer. The wireless communication device 104 may also include an inactivity threshold 120. When the wireless communication device 104 switches from a source radio access technology (RAT) 106a to a target radio access technology (RAT) 106b, the wireless communication device 104 may handle existing Packet Data Network (PDN) connections 110 differently when both the first application 112a and the second application 112b have been inactive longer than the inactivity threshold 120 than when one or both applications 112 have not been inactive longer than the inactivity threshold 120.

The wireless communication device 104 may further include a throttling timer 122. When the wireless communication device 104 switches from a source radio access technology (RAT) 106a to a target radio access technology (RAT) 106b, the wireless communication device 104 may handle existing Packet Data Network (PDN) connections 110 differently when one or both of the IP addresses 114 assigned to the applications 112 is throttled (and thus has a throttling timer 122 running). The wireless communication device 104 may also include a dropped IP address timer 111. The dropped IP address timer 111 may be started by the wireless communication device 104 when the wireless communication device 104 moves from a source radio access technology (RAT) 106a to a target radio access technology (RAT) 106b (and thus drops one of the IP addresses 114 used by one of the applications 112). Until the dropped IP address timer 111 has expired, the dropped IP address 114 may be stored by the wireless communication device 104 in case the wireless communication device 104 moves back to the source radio access technology (RAT) 106a. If the wireless communication device 104 does not return to the source radio access technology (RAT) 106a before the dropped IP address timer 111 expires, the dropped IP address 114 on the target radio access technology (RAT) 106b is also considered dropped on the source radio access technology (RAT) 106a. The inactivity threshold 120, throttling timer 122 and dropped IP address timer 111 are discussed in additional detail below in relation to FIG. 7.

Figure 2:
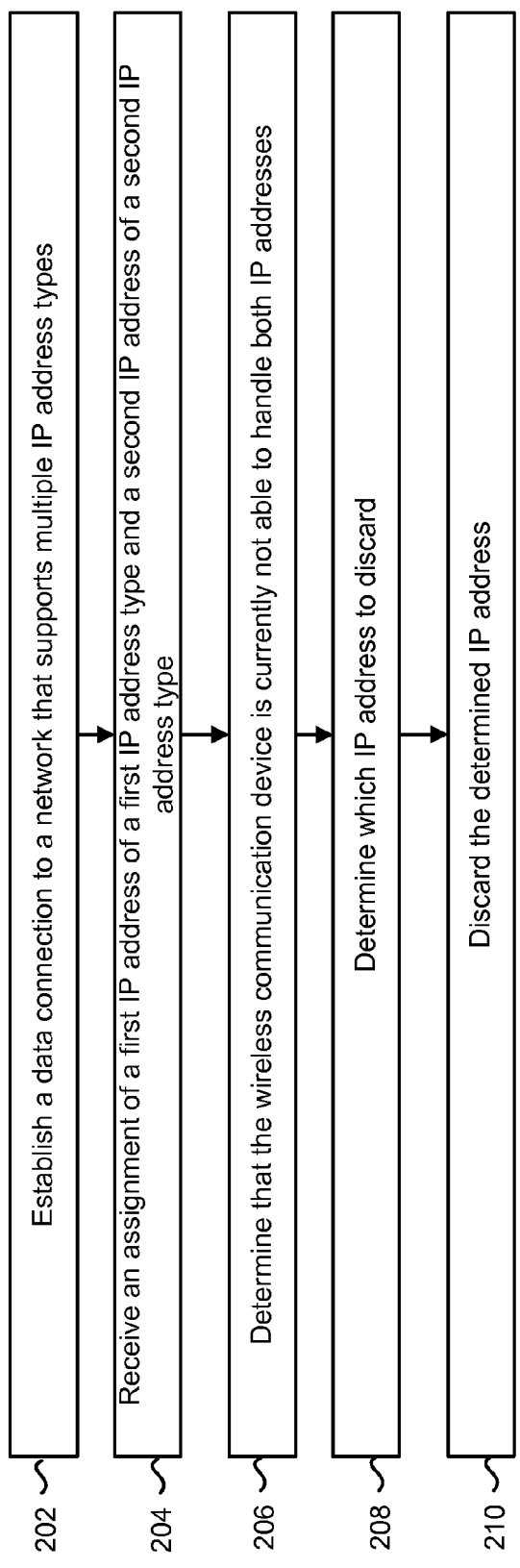
FIG. 2 is a flow diagram of a method for discarding an IP address.

FIG. 2 is a flow diagram of a method 200 for discarding an IP address 114. The method 200 may be performed by a wireless communication device 104. In one configuration, the method 200 may be performed by Advanced Mobile Subscriber Software (AMSS) 108 on the wireless communication device 104. The wireless communication device 104 may establish 202 a data connection to a network that supports multiple IP address 114 types 116. The wireless communication device 104 may then receive 204 an assignment of a first IP address 114a of a first type 116a and a second IP address 114b of a second type 116b. In one configuration, the first IP address 114a may be an IPv4 address and the second IP address 114b may be an IPv6 address.

The wireless communication device 104 may determine 206 that the wireless communication device 104 is currently not able to handle both IP addresses 114. For example, the wireless communication device 104 may determine 206 that the configurations of the network are such that the network does not support dual-IP bearer connections (e.g., the network uses an evolved High Rate Packet Data (eHRPD) radio access technology (RAT) 106). As another example, the wireless communication device 104 may not support dual-IP stack. In yet another configuration, the wireless communication device 104 may have moved from a source radio access technology (RAT) 106a that does support dual-IP bearer connections to a target radio access technology (RAT) 106b that does not support dual-IP bearer connections.

The wireless communication device 104 may determine 208 which IP address 114 to discard. In one configuration, the wireless communication device 104 may determine 208 which IP address 114 to discard based on whether an application 112 that requested an IP address 114 specified the IP address 114 type 116. In another configuration, the wireless communication device 104 may determine 208 which IP address 114 to discard based on whether an operator specified an IP address 114 type 116 to be retained. If neither the application 112 nor the operator has specified an IP address 114 type 116 to be retained, the wireless communication device 104 may always discard the IPv4 address and retain the IPv6 address since IPv4 addresses are scarce and tend to get exhausted. The wireless communication device 104 may discard 210 the determined IP address 114.

Figure 3:
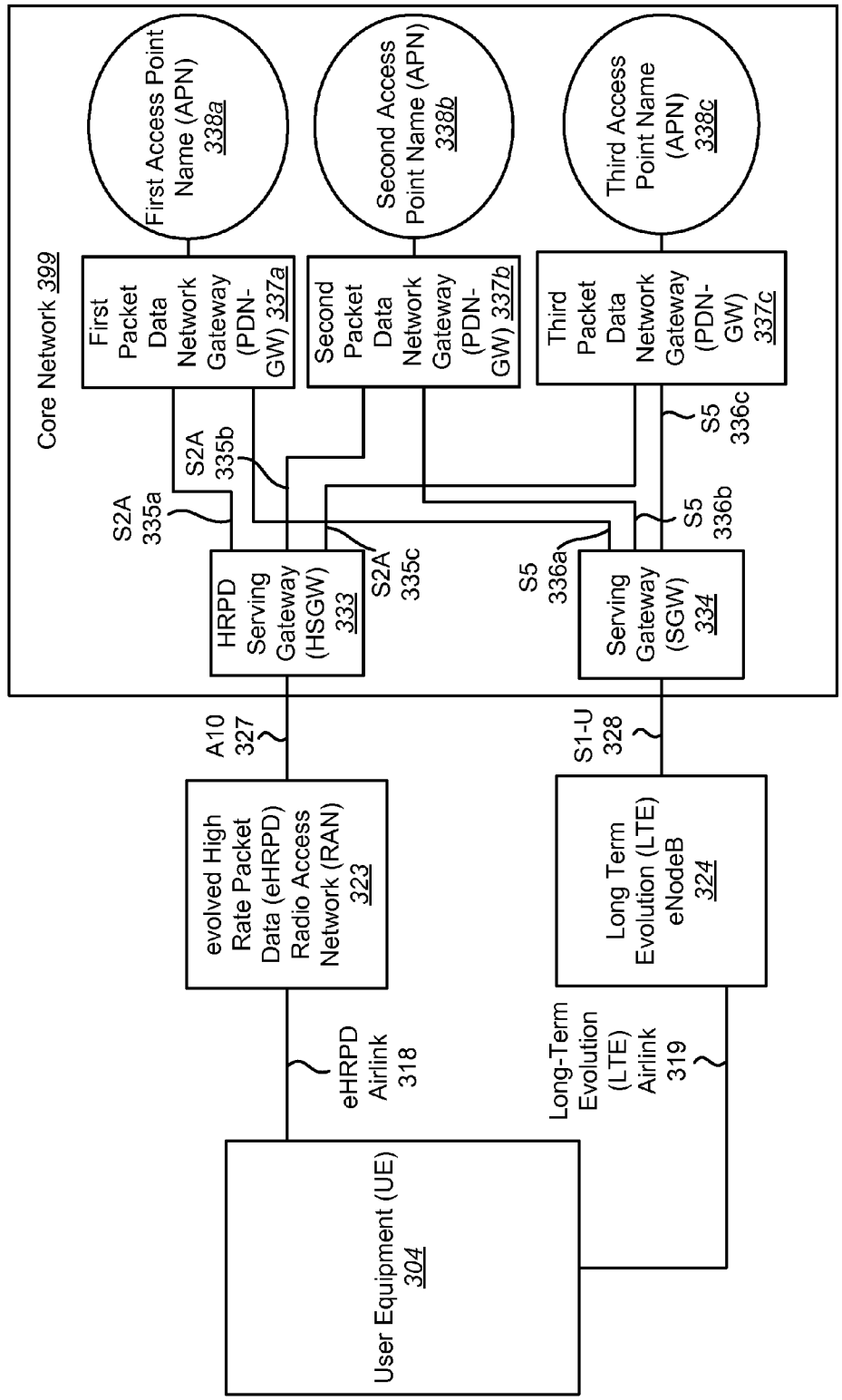
FIG. 3 is a block diagram illustrating various types of connectivity between a user equipment (UE) and a core network that the user equipment (UE) may utilize for data services and/or voice services.

FIG. 3 is a block diagram illustrating various types of connectivity between a user equipment (UE) 304 and a core network 399 that the user equipment (UE) 304 may utilize for data services and/or voice services. The user equipment (UE) 304 of FIG. 3 may be one configuration of the wireless communication device 104 of FIG. 1. The network architecture may include data connectivity via an evolved high rate packet data (EHRPD) airlink 318 and an evolved high rate packet data (EHRPD) radio access network (RAN) 323 to a core network 399. The evolved high rate packet data (EHRPD) radio access network (RAN) 323 may employ an A10 interface 327 to connect to an HRPD Serving Gateway (HSGW) 333. The network architecture may also include data connectivity to the core network 399 via a Long Term Evolution (LTE) airlink 319 and a Long Term Evolution (LTE) eNodeB 324.

The Long Term Evolution (LTE) eNodeB 324 may employ an S1-U interface 328 to connect to a Serving Gateway (SGW) 334. The HRPD Serving Gateway (HSGW) 333 may connect to a first Packet Data Network Gateway (PDN-GW) 337a, a second Packet Data Network Gateway (PDN-GW) 337b and a third Packet Data Network Gateway (PDN-GW) 337c via S2A interfaces 335a-c. The Serving Gateway (SGW) 334 may connect with the first Packet Data Network Gateway (PDN-GW) 337a, the second Packet Data Network Gateway (PDN-GW) 337b and the third Packet Data Network Gateway (PDN-GW) 337c via S5 interfaces 336a-c. The first Packet Data Network Gateway (PDN-GW) 337a may connect to a first access point name (APN) 338a. The second Packet Data Network Gateway (PDN-GW) 337b may connect to a second access point name (APN) 338b. The third Packet Data Network Gateway (PDN-GW) 337c may connect to a third access point name (APN) 338c. An access point name (APN) 338 may include, but is not limited to, an Internet Multimedia System (IMS) that a user equipment (UE) 304 connects to for obtaining Voice over IP (VoIP) or video telephony services or an Administrative access point name (APN) 338 the user equipment (UE) 304 may establish a connection with in order to download configuration information for the user equipment (UE) 304.

The user equipment (UE) 304 may move through the network. As the user equipment (UE) 304 moves through the network, the user equipment (UE) 304 may move from an area with coverage provided by one radio access technology (RAT) 106 to an area with coverage provided by another radio access technology (RAT) 106. Thus, the user equipment (UE) 304 may switch from a source radio access technology (RAT) 106a to a target radio access technology (RAT) 106b. A common core network 399 may support both radio access technologies (RATs) 106. When the user equipment (UE) 304 moves from a source radio access technology (RAT) 106a to a target radio access technology (RAT) 106b, the IP address 114 or IP addresses 114 associated with a Packet Data Network (PDN) connection 110 of the user equipment (UE) 304 may need to be adjusted (e.g., one of the IP addresses 114 may need to be discarded).

Figure 4:
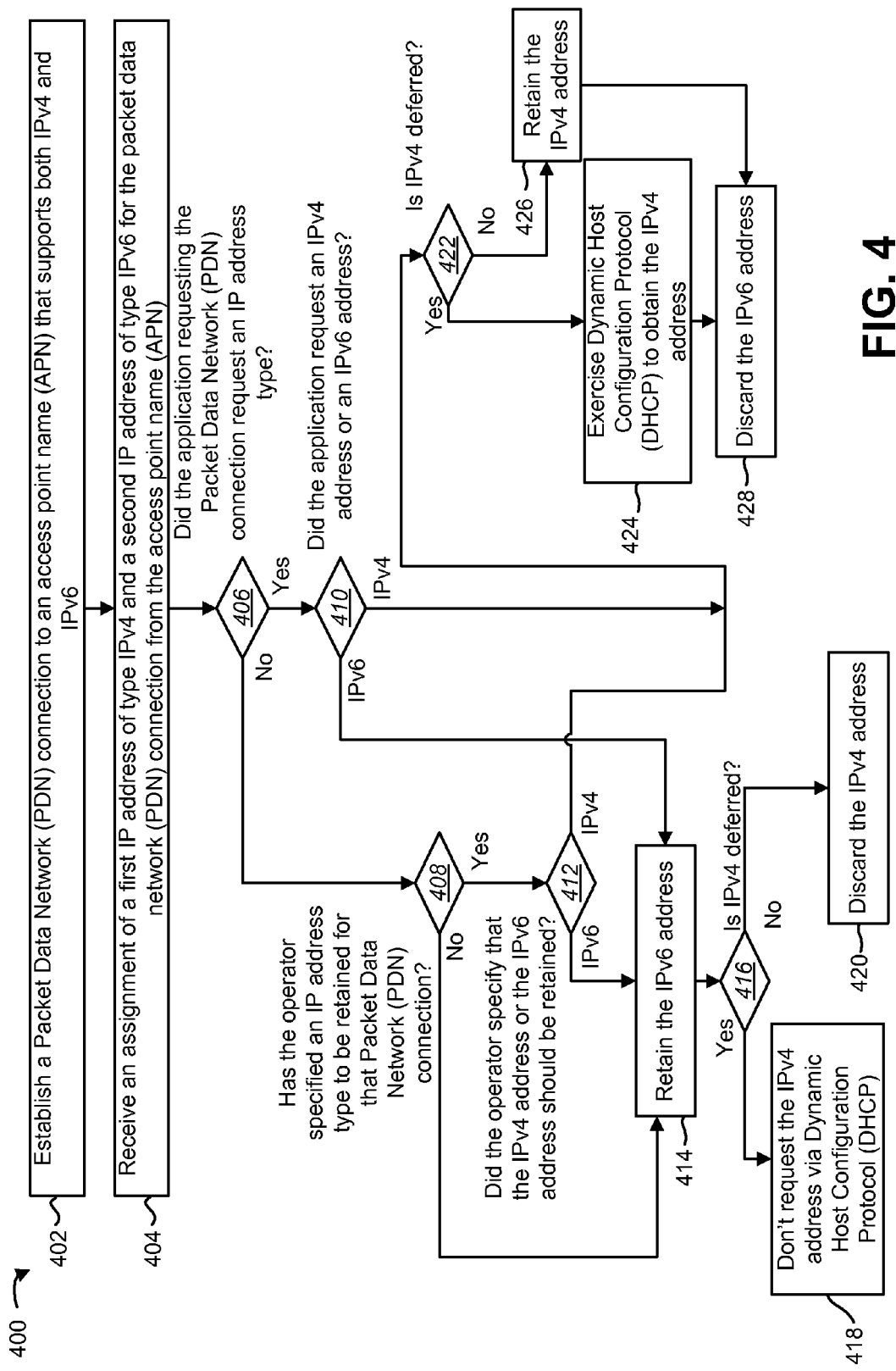
FIG. 4 is a flow diagram of another method for discarding an IP address.

FIG. 4 is a flow diagram of another method 400 for discarding an IP address 114. The method 400 may be performed by a wireless communication device 104. In one configuration, the method 400 may be performed by an Advanced Mobile Subscriber Software (AMSS) 108 on the wireless communication device 104. The wireless communication device 104 may establish 402 a Packet Data Network (PDN) connection 110 to an access point name (APN) 138 that supports both IPv4 and IPv6 (i.e., the access point name (APN) 138 is dual-IP bearer capable). The wireless communication device 104 may be capable of handling dual-IP bearers or the wireless communication device 104 may not be capable of handling dual-IP bearers (e.g., the wireless communication device 104 may not be capable of handling dual-IP bearers in only one technology such as evolved High Rate Packet Data (eHRPD)). The wireless communication device 104 may receive 404 an assignment of a first IP address 114 of type IPv4 and a second IP address 114 of type IPv6 for the Packet Data Network (PDN) connection 110 from the access point name (APN) 138.

If the wireless communication device 104 is not capable of handling dual-IP bearer, the wireless communication device 104 may determine to discard one of the assigned IP addresses 114. The wireless communication device 104 may determine 406 whether the application 112 requesting the Packet Data Network (PDN) connection 110 also requested an IP address 114 type 116. If the application 112 requesting the Packet Data Network (PDN) connection 110 did request an IP address 114 type 116, the wireless communication device 104 may determine 410 whether the application 112 requested an IPv4 address or an IPv6 address. If the application 112 requested an IPv6 address, the wireless communication device 104 may retain 414 the IPv6 address.

If the application 112 requested an IPv4 address, the wireless communication device 104 may determine 422 whether IPv4 is deferred (i.e., whether an IPv4 address has already been obtained or whether the wireless communication device 104 will use Dynamic Host Configuration Protocol (DHCP) to obtain the IPv4 address). If IPv4 is not deferred (and thus the wireless communication device 104 already has an IPv4 address), the wireless communication device 104 may retain 426 the IPv4 address and discard 428 the IPv6 address. If IPv4 is deferred, the wireless communication device 104 may exercise 424 Dynamic Host Configuration Protocol (DHCP) to obtain the IPv4 address. The wireless communication device 104 may also discard 428 the IPv6 address.

If the application 112 requesting the Packet Data Network (PDN) connection 110 has not requested an IP address 114 type 116, the wireless communication device 104 may determine 408 whether the operator has specified an IP address 114 type 116 to be retained for that Packet Data Network (PDN) connection 110. If the operator has not specified an IP address 114 type 116 to be retained for that Packet Data Network (PDN) connection 110, the wireless communication device 104 may retain 414 the IPv6 address (because IPv4 addresses are scarce and tend to get exhausted). If the operator has specified an IP address 114 type 116 to be retained for that Packet Data Network (PDN) connection 110, the wireless communication device 104 may determine 412 whether the operator specified that IPv4 addresses or IPv6 addresses should be retained. If the operator has specified that IPv4 addresses be retained for that Packet Data Network (PDN) connection 110, the wireless communication device 104 may determine 422 whether IPv4 is deferred. The operator may specify, on a per-APN basis, which IP address 114 type 116 the Advanced Mobile Subscriber Software (AMSS) 108 should discard by default if both IP addresses 114 are assigned to a Packet Data Network (PDN) connection 110 by the network. For example, an operator can specify that for a first access point name (APN) 138 (APN1), the IPv6 address should always be retained but for a second access point name (APN) 138 (APN2), the IPv4 address should always be retained.

If the operator has specified that IPv6 addresses be retained, the wireless communication device 104 may retain 314 the IPv6 address. The wireless communication device 104 may determine 416 whether IPv4 is deferred. If IPv4 is deferred, the wireless communication device 104 may not request 418 the IPv4 address via Dynamic Host Configuration Protocol (DHCP). If IPv4 is not deferred, the wireless communication device 104 may discard 420 the IPv4 address.

Figure 5:
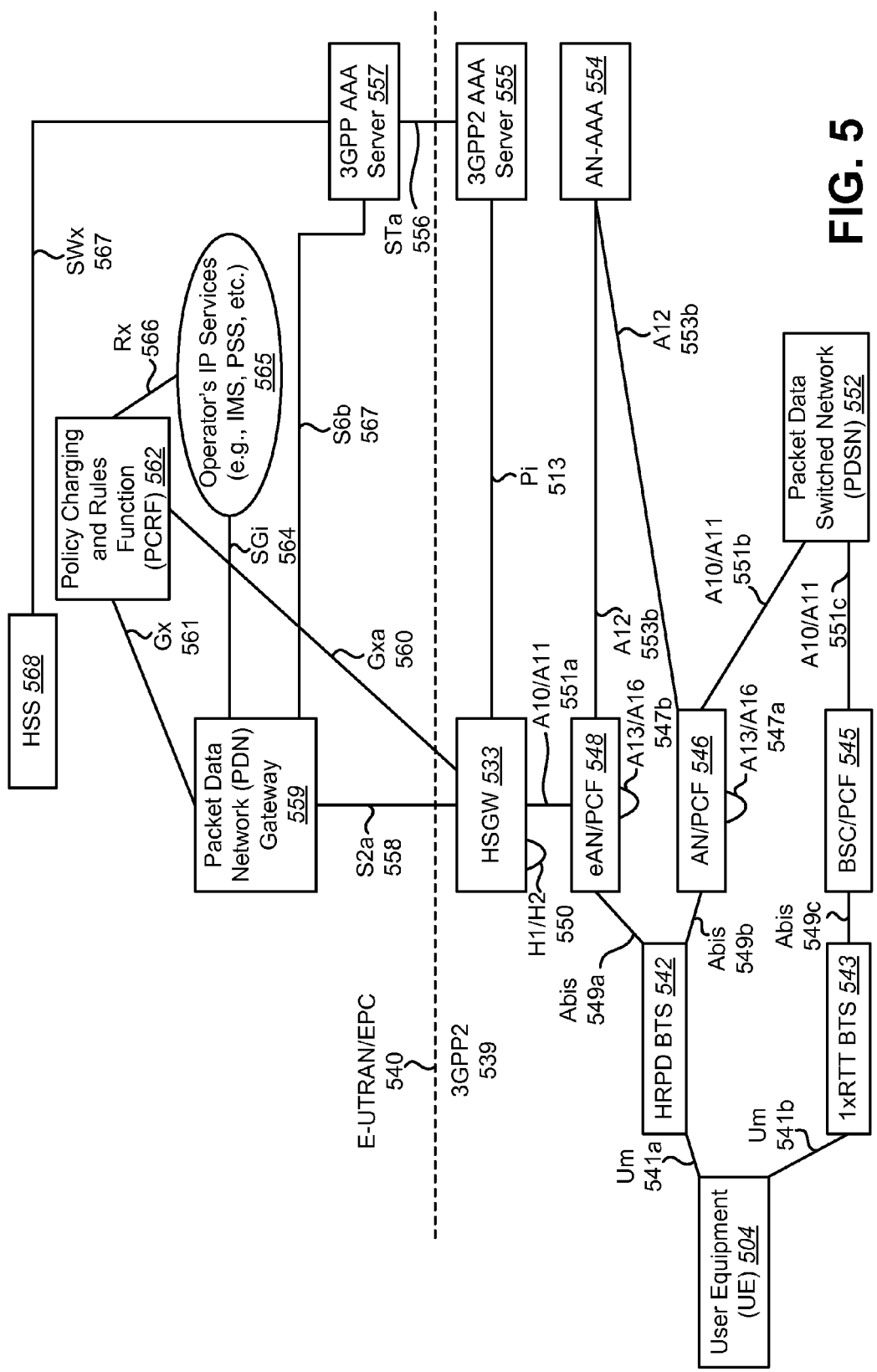
FIG. 5 is a block diagram illustrating the network architecture for evolved High Rate Packet Data (eHRPD)

FIG. 5 is a block diagram illustrating the network architecture for evolved High Rate Packet Data (eHRPD). The user equipment (UE) 504 of FIG. 5 may be one configuration of the wireless communication device 104 of FIG. 1. Unlike an access terminal (AT), a user equipment (UE) 504 has the ability to obtain services from multiple access point names (APNs) 138 via multiple Packet Data Network Gateways (PDN-GWs) 559. Such a connection from a user equipment (UE) 504 to a Packet Data Network Gateway (PDN-GW) 559 is called a Packet Data Network (PDN) connection 110. For each Packet Data Network (PDN) connection 110, a user equipment (UE) 504 is assigned one or two IP addresses 114 by the Packet Data Network Gateway (PDN-GW) 559.

The user equipment (UE) 504 may be assigned a single IPv4 address, a single IPv6 address or both an IPv4 address and an IPv6 address, depending on the capability and type of services offered by the access point name (APN) 138. A Packet Data Network (PDN) connection 110 between the user equipment (UE) 504 and a Packet Data Network Gateway (PDN-GW) 559 is not a direct connection. In evolved High Rate Packet Data (eHRPD), the HRPD Serving Gateway (HSGW) 533 communicates with the user equipment (UE) 504 and manages every Packet Data Network (PDN) connection 110 with the user equipment (UE) 504. In Long Term Evolution (LTE), a serving gateway (SGW) 334 communicates with the user equipment (UE) 504 and manages every Packet Data Network (PDN) connection 110 with the user equipment (UE) 504. The HRPD Serving Gateway (HSGW) 533 (or serving gateway (SGW) 334) then communicates with the Packet Data Network Gateway (PDN-GW) 559 for each Packet Data Network (PDN) connection 110.

In 3GPP2 539, the user equipment (UE) 504 may communicate with an HRPD base transceiver station (BTS) 542 via a Um interface 541a or a 1xRTT base transceiver station (BTS) 543 via a Um interface 541b. The 1 xRTT base transceiver station (BTS) 543 may communicate with a base station controller (BSC)/packet control function (PCF) 545 via an Abis interface 548c. The base station controller (BSC)/packet control function (PCF) 545 may then communicate with a packet data serving node (PDSN) 552 via an A10/A11 interface 551c. The packet data serving node (PDSN) 552 may communicate with an access node (AN)/packet control function (PCF) 546 via an A10/A11 interface 551b. The HRPD base transceiver station (BTS) 542 may communicate with the access network (AN)/Packet Control Function (PCF) 546 via an Abis interface 544b. The access network (AN)/Packet Control Function (PCF) 546 may communicate with an AN-AAA (authentication, authorization and accounting access network) 554 via an A12 interface 553b.

The HRPD base transceiver station (BTS) 542 may communicate with an evolved access network (eAN)/Packet Control Function (PCF) 548 via an Abis interface 544a. The evolved access network (eAN)/Packet Control Function (PCF) 548 may then communicate with the AN-AAA (authentication, authorization and accounting access network) 554 via an A12 interface 553b. The evolved access network (eAN)/Packet Control Function (PCF) 548 may further communicate with an HRPD Serving Gateway (HSGW) 533 via an A10/A11 interface 551a. The HRPD Serving Gateway (HSGW) 553 may communicate with a 3GPP2 AAA (authentication, authorization and accounting) serve 555 via a Pi interface 513. The A13/A16 interface 547a-b may be the interface between two access networks (ANs)/Packet Control Functions (PCFs) 546 or two evolved access networks (eANs)/Packet Control Functions (PCFs) 548. The H1/H2 interface 550 may be the interface between two HRPD Serving Gateways (HSGWs) 533.

The evolved UMTS Terrestrial Radio Access Network (E-UTRAN)/Evolved Packet Core (EPC) 540 may include a Home Subscriber Service (HSS) 568, one or more Packet Data Network Gateways (PDN-GWs) 559, a Policy Charging and Rules Function (PCRF) 562, operator IP services 565 (e.g., Internet Multimedia System (IMS), Packet-switched Streaming Service (PSS), etc.) and a 3GPP AAA (authentication, authorization and accounting) server 557. The Packet Data Network Gateway (PDN-GW) 559 may communicate with the HRPD Serving Gateway (HSGW) 533 via an S2a interface 558, with the Policy Charging and Rules Function (PCRF) 562 via a Gx interface 561, with the operator IP services 565 via an SGi interface 564 and with the 3GPP AAA (authentication, authorization and accounting) server 557 via an S6b interface 536. The Policy Charging and Rules Function (PCRF) 562 may communicate with the HRPD Serving Gateway (HSGW) 533 via a Gxa interface 560 and with the operator IP services 565 via an Rx interface 566. The 3GPP AAA (authentication, authorization and accounting) server 557 may communicate with the 3GPP2 AAA (authentication, authorization and accounting) server 555 via an STa interface 556 and with the Home Subscriber Service (HSS) 568 via an SWx interface 567.

Figure 6:
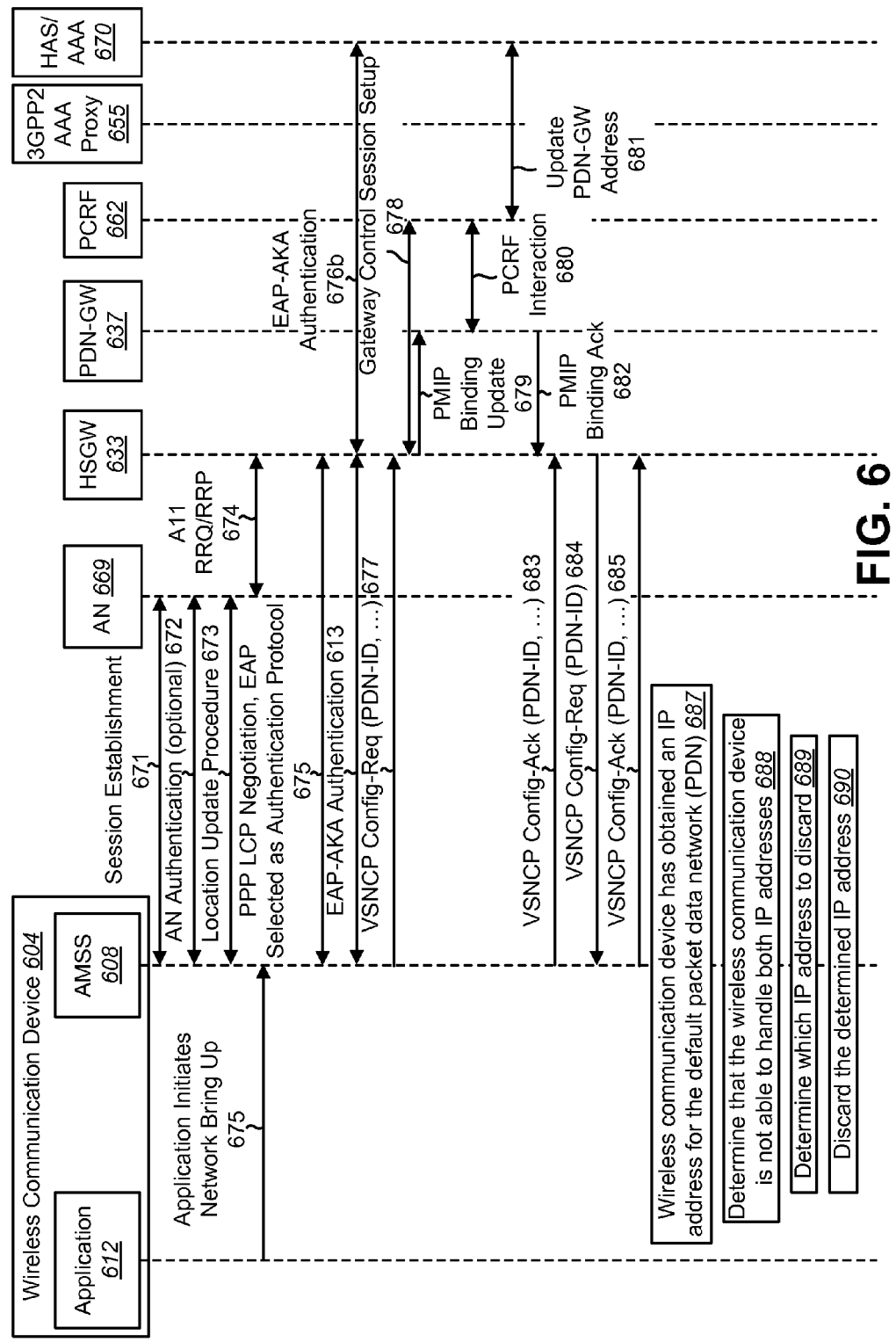
FIG. 6 is a call flow diagram illustrating the setup of a Packet Data Network (PDN) connection between a wireless communication device and a Packet Data Network Gateway (PDN-GW)

FIG. 6 is a call flow diagram illustrating the setup of a Packet Data Network (PDN) connection 110 between a wireless communication device 604 and a Packet Data Network Gateway (PDN-GW) 637. The wireless communication device 604 of FIG. 6 may be one configuration of the wireless communication device 104 of FIG. 1. The wireless communication device 104 may include an application 612 and an Advanced Mobile Subscriber Software (AMSS) 608. The network may include an access network (AN) 669, an HRPD Serving Gateway (HSGW) 633, the Packet Data Network Gateway (PDN-GW) 637, a Policy Charging and Rules Function (PCRF) 662, a 3GPP2 AAA (authentication, authorization and accounting) proxy 655 and a Home Subscriber Service (HSS)/AAA (authentication, authorization and accounting) 670.

In evolved High Rate Packet Data (eHRPD), the protocol for communication between a wireless communication device 604 and the HRPD Serving Gateway (HSGW) 633 is Point-to-Point Protocol (PPP). Point-to-Point Protocol (PPP) has three stages, Link Control Protocol (LCP), Authentication, and Network Control Protocol (NCP) before user data transfer takes place. In evolved High Rate Packet Data (eHRPD), the authentication protocol is Extensible Authentication Protocol Method for UMTS Authentication and Key Agreement (EAP-AKA) and the Network Control Protocol (NCP) is Vendor-Specific Network Control Protocol (VSNCP). Data transfer is over Vendor-Specific Network Protocol (VSNP). The Link Control Protocol (LCP) and the Extensible Authentication Protocol Method for UMTS Authentication and Key Agreement (EAP-AKA) between the user equipment (UE) 604 and the HRPD Serving Gateway (HSGW) 633 have only one instance common to all Packet Data Network (PDN) connections 110. The Vendor-Specific Network Control Protocol (VSNCP) and Vendor-Specific Network Protocol (VSNP) have an instance per Packet Data Network (PDN) connection 110.

The Advanced Mobile Subscriber Software (AMSS) 608 may signal a session establishment 671 with the access network (AN) 669. Access network (AN) authentication 672 between the Advanced Mobile Subscriber Software (AMSS) 608 and the access network (AN) 669 may occur. A location update procedure 673 between the Advanced Mobile Subscriber Software (AMSS) 608 and the access network (AN) 669 may then occur. An A11' RRQ/RRP (registration request/registration reply) 674 between the access network (AN) 669 and the HRPD Serving Gateway (HSGW) 633 may then occur. The first application 604 may initiate 675 the network bring up to the Advanced Mobile Subscriber Software (AMSS) 608. The Advanced Mobile Subscriber Software (AMSS) 608 may then perform Point-to-Point Protocol (PPP) Link Control Protocol (LCP) negotiation 613 with the HRPD Serving Gateway (HSGW) 633, where Extensible Authentication Protocol (EAP) is selected as the authentication protocol. Extensible Authentication Protocol Method for UMTS Authentication and Key Agreement (EAP-AKA) authentication 676*a-b* between the Advanced Mobile Subscriber Software (AMSS) 608, the HRPD Serving Gateway (HSGW) 633 and the Home Subscriber Service (HSS)/AAA (authentication, authorization and accounting) 670 may then occur.

When the wireless communication device 604 wants to establish connectivity to a Packet Data Network (PDN) 110, the Advanced Mobile Subscriber Software (AMSS) 608 will send a VSNCP Config-Req message 677 to the HRPD Serving Gateway (HSGW) 633 (a VSNCP Config-Req message 677 may also be sent to a HRPD Serving Gateway (HSGW) 633 when the wireless communication device 604 is requesting additional Packet Data Network (PDN) connections 110). The VSNCP Config-Req message 677 may indicate the wireless communication device's 604 capability with respect to IP address 114 type 116 support for the wireless communication device 604 as a whole. However, the VSNCP Conf-Req message 677 does not indicate what IP address 114 type 116 the wireless communication device 604 actually wants for a particular Packet Data Network (PDN) connection 110. In other words, the VSNCP Config-Req message 677 may not indicate what the application 612 trying to connect to the particular access point name (APN) 138 wants.

The VSNCP Config-Req message 677 may include the fields PDN-ID, APN, PDN Type, PDN Address, PCO and Attach Type. The PDN-ID field includes a unique identifier assigned by the wireless communication device 604 to a Packet Data Network (PDN) connection 110. The APN field may include the name of the access point name (APN) 138 the wireless communication device 604 wants to establish a Packet Data Network (PDN) connection 110 with. PDN Type refers to the wireless communication device's 604 IP address 114 type 116 capability. If the wireless communication device 604 supports only IPv4, the PDN Type field will include v4. If the wireless communication device 604 supports only IPv6, the PDN Type field will include v6. If the wireless communication device 604 supports both IPv4 and IPv6, the PDN Type field will include v4/v6.

The PDN Address field is left empty if the wireless communication device 604 is connecting to the Packet Data Network (PDN) 110 for the first time. The PDN Address field includes the IP address 114 the wireless communication device 604 requests if the wireless communication device 604 had previously connected to the Packet Data Network (PDN) 110 and was assigned that IP address 114 previously on another radio access technology (RAT) 106 (e.g., Long Term Evolution (LTE)). The PCO field may use Protocol Configuration Options (PCO) to transfer parameters between the wireless communication device 604 and the Packet Data Network Gateway (PDN-GW) 637, and is sent transparently through the HRPD Serving Gateway (HSGW) 633. The Attach Type field indicates whether the wireless communication device 604 is connecting to this Packet Data Network (PDN) 110 for the first time (Initial Attach) or had previously connected (on Long Term Evolution (LTE)).

A Gateway Control Session Setup 678 between the HRPD Serving Gateway (HSGW) 633 and the Policy Charging and Rules Function (PCRF) 662 may occur. The HRPD Serving Gateway (HSGW) 633 may then send a Proxy Mobile IP (PMIP) binding update 679 to the Packet Data Network Gateway (PDN-GW) 637. The Policy Charging and Rules Function (PCRF) interaction 680 may occur between the Packet Data Network Gateway (PDN-GW) 637 and the Policy Charging and Rules Function (PCRF) 662. The Policy Charging and Rules Function (PCRF) 662 and the Home Subscriber Service (HSS)/AAA (authentication, authorization and accounting) 670 may then communicate to update 681 the Packet Data Network Gateway (PDN-GW) 637 address.

The Packet Data Network Gateway (PDN-GW) 637 may send a Proxy Mobile IP (PMIP) binding acknowledgement 682 to the HRPD Serving Gateway (HSGW) 633. The HRPD Serving Gateway (HSGW) 633 may send a VSNCP Config-Ack message 683 to the Advanced Mobile Subscriber Software (AMSS) 608. The VSNCP Config-Ack message 683 may include the fields PDN-ID, APN, PDN Type, PDN address, PCO and Attach Type. The PDN-Type field in the VSNCP Config-Ack message 683 may indicate what IP address 114 type 116 the network wants the wireless communication device 604 to use. The HRPD Serving Gateway (HSGW) 633 may also send a VSNCP Conf-Req message 684 to the Advanced Mobile Subscriber Software (AMSS) 608 that includes the PDN-ID. The Advanced Mobile Subscriber Software (AMSS) 608 may then send a VSNCP Config-Ack message 685 to the HRPD Serving Gateway (HSGW) 633 that includes the PDN-ID.

The wireless communication device 604 has then obtained one or two IP addresses 114 for the default Packet Data Network (PDN) 110. If the wireless communication device 604 has obtained two IP addresses 114 but only needs or is capable of using one IP address 114, the Advanced Mobile Subscriber Software (AMSS) 608 may determine 687 that the wireless communication device 604 is not able to handle both IP addresses 114. The Advanced Mobile Subscriber Software (AMSS) 608 may determine 688 which IP address 114 to discard. The Advanced Mobile Subscriber Software (AMSS) 608 may then discard 689 the determined IP address 114.

Figure 7:
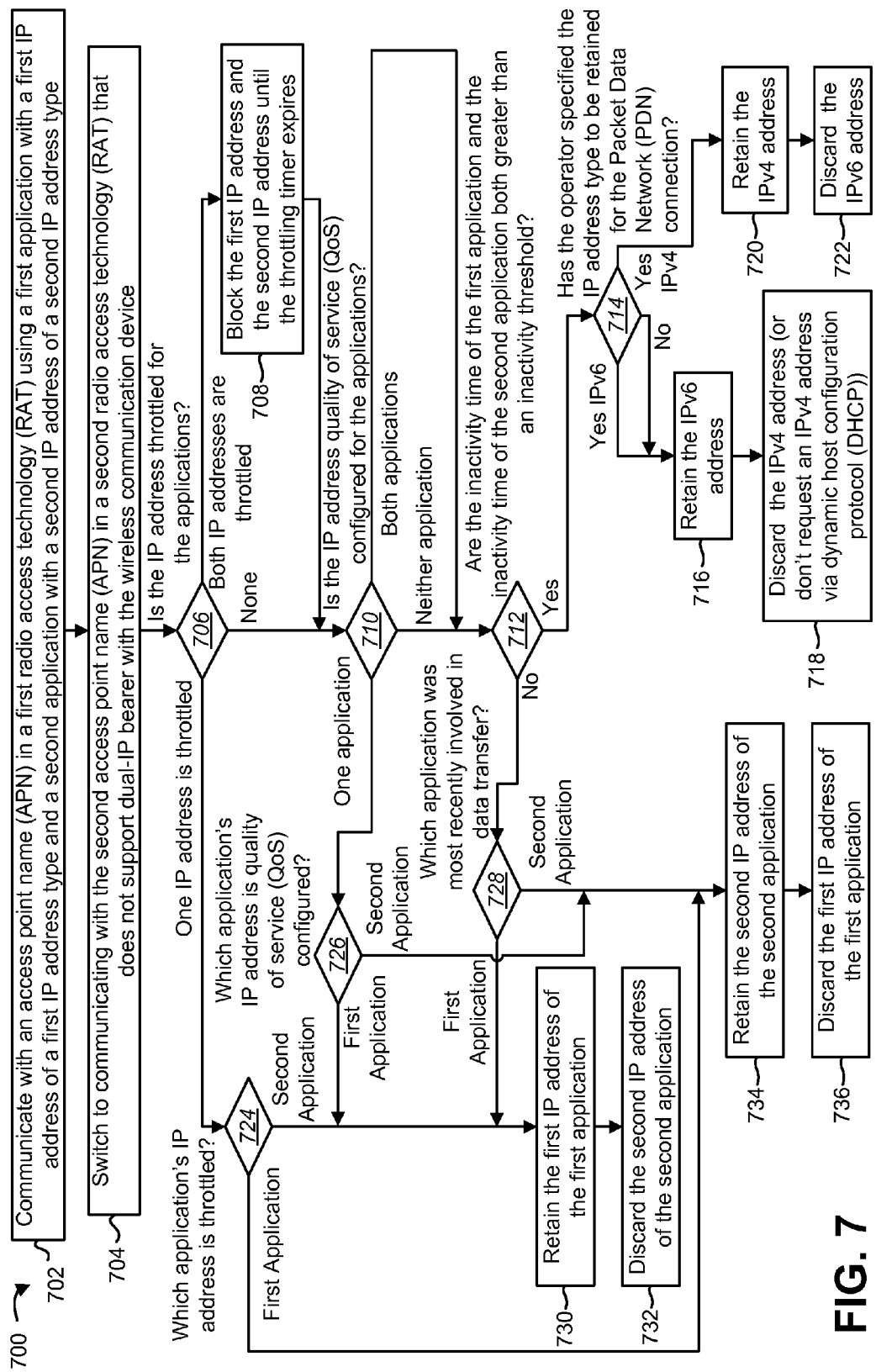
FIG. 7 is a flow diagram of a method for discarding an IP address after transitioning to a radio access technology (RAT) that does not support dual-IP bearer (or two single IP bearers to the same access point name (APN))

FIG. 7 is a flow diagram of a method 700 for discarding an IP address 114 after transitioning to a radio access technology (RAT) 106 that does not support dual-IP bearer (or two single IP bearers to the same access point name (APN) 138). The method 700 may be performed by a wireless communication device 104. In one configuration, the method 700 may be performed by an Advanced Mobile Subscriber Software (AMSS) 108 on a wireless communication device 104. The wireless communication device 104 may communicate 702 with an access point name (APN) 138 of a first radio access technology (RAT) 106*a* using a first application 112*a* with a first IP address 114*a* and a second application 112*b* with a second IP address 114*b*. The first IP address 114*a* and the second IP address 114*b* may have different IP address 114 types 116. For example, the first IP address 114*a* may be an IPv4 address and the second IP address 114*b* may be an IPv6 address. The first radio access technology (RAT) 106*a* may support either dual-IP bearer or two single IP bearers to the first radio access technology (RAT) 106*a*. In one configuration, the first radio access technology (RAT) 106*a* may be Long Term Evolution (LTE).

The wireless communication device 104 may then switch 704 to communicating with the access point name (APN) 138 in a second radio access technology (RAT) 106b that does not support dual-IP bearer with the wireless communication device 104. In one configuration, the second radio access technology (RAT) 106b may be evolved High Rate Packet Data (eHRPD). There are two scenarios where the wireless communication device 104 would need to discard one of the IP addresses 114. In the first scenario, the first IP address 114a and the second IP address 114b are two single address bearers, thus the wireless communication device 104 is not capable of handling dual-IP bearer. When the wireless communication device 104 switches 704 to evolved High Rate Packet Data (eHRPD), evolved High Rate Packet Data (eHRPD) does not support two single address bearers to the same access point name (APN) 138 and the wireless communication device 104 must discard one of the IP addresses 114 (or request setup of only one bearer with a single IP address 114). In the second scenario, the wireless communication device 104 is capable of handling dual-IP bearer but the second radio access technology (RAT) 106b is evolved High Rate Packet Data (eHRPD) (where the wireless communication device 104 is not capable of handling dual-IP bearer).

The wireless communication device 104 may determine 706 whether the IP address 114 is throttled for any of the applications 112. If the IP addresses 114 for both applications 112 are throttled, the wireless communication device 104 may block 708 the first IP address 114a and the second IP address 114b until the throttling timers 122 expire. Once the throttling timers 122 have expired, the wireless communication device 104 may determine 710 whether the IP addresses 114 of the applications 112 are Quality of Service (QoS) configured. If neither IP address 114 for the applications 112 is throttled, the wireless communication device may determine 710 whether the IP addresses 114 of the applications are Quality of Service (QoS) configured.

If either both of the applications have an IP address 114 that is Quality of Service (QoS) configured or neither of the applications have an IP address 114 that is Quality of Service (QoS) configured, the wireless communication device 104 may determine 712 whether the inactivity time 118a of the first application 112a and the inactivity time 118b of the second application 112b are both greater than an inactivity threshold $T_{inactive}$ 120 (e.g., 15 minutes). If the inactivity time 118a of the first application 112a and the inactivity time 118b of the second application 112b are both greater than the inactivity threshold $T_{inactive}$ 120, the wireless communication device 104 may determine 714 whether the operator has specified the IP address 114 type 116 to be retained for the Packet Data Network (PDN) connection 110. If the operator has specified that IPv4 is to be retained for the Packet Data Network (PDN) connection 110, the wireless communication device 104 may retain 720 the IPv4 address and discard 722 the IPv6 address. If the operator has specified that IPv6 is to be retained for the Packet Data Network (PDN) connection 110 or if the operator has not specified the IP address 114 type 116 to be retained for the Packet Data Network (PDN) connection 110, the wireless communication device 104 may retain 716 the IPv6 address. The wireless communication device 104 may also discard 718 the IPv4 address (or not request an IPv4 address via Dynamic Host Configuration Protocol (DCHP) if the IPv4 address is deferred).

If the inactivity time 118a of the first application 112a and the inactivity time 118b of the second application 112b are not both greater than the inactivity threshold $T_{inactive}$ 120 (i.e., one or both the inactivity time 118a of the first application 112a and the inactivity time 118b of the second application 112b is less than the inactivity threshold $T_{inactive}$ 120), the wireless communication device 104 may determine 728 which application 112 was most recently involved in data transfer. Thus, the wireless communication device 104 may compare the inactivity time 118a of the first application 112a with the inactivity time 118b of the second application 112b to determine the lesser inactivity time 118. If the first application 112a has the lesser inactivity time 118a (and was thus most recently involved in data transfer), the wireless communication device 104 may retain 730 the first IP address 114a of the first application 112a. The wireless communication device 104 may also discard 732 the second IP address 114b of the second application 112b. If the second application 112b has the lesser inactivity time 118b, the wireless communication device 104 may retain 734 the second IP address 114b of the second application 112b. The wireless communication device 104 may also discard 736 the first IP address 116a of the first application 112a.

If only one application 112 has an IP address 116 that is Quality of Service (QoS) configured, the wireless communication device 104 may determine 726 which application has an IP address 114 that is Quality of Service (QoS) configured. If the first IP address 114a of the first application 112a is Quality of Service (QoS) configured, the wireless communication device 104 may retain 730 the first IP address 114a of the first application 112a and discard 732 the second IP address 114b of the second application 112b. If the second IP address 114b of the second application 112b is Quality of Service (QoS) configured, the wireless communication device 104 may retain 734 the second IP address 114b of the second application 112b and discard 736 the first IP address 114a of the first application 112a.

If only one application has an IP address 114 that is throttled, the wireless communication device 104 may determine 724 which application 112 has an IP address 114 that is throttled. If the first application 112a has an IP address 114a that is throttled, the wireless communication device 104 may retain 734 the second IP address 114b of the second application 112b and discard 736 the first IP address 114a of the first application 112a. If the second application 112b has an IP address 114b that is throttled, the wireless communication device 104 may retain 730 the first IP address 114a of the first application 112a and discard 732 the second IP address 114b of the second application 112b.

Upon discarding an IP address 114, the application 112 that was using the IP address 114 is notified by the Advanced Mobile Subscriber Software (AMSS) 108 that an IP interface is no longer available. In one configuration, when the Advanced Mobile Subscriber Software (AMSS) 108 discards an IP address 114, the IP address 114 is considered discarded for both the source radio access technology (RAT) 106a and the target radio access technology (RAT) 106b. Thus, if the wireless communication device 104 goes back to the source radio access technology (RAT) 106a, the discarded IP address 114 cannot be used again. Instead, the wireless communication device 104 should clean up the corresponding IP interface permanently. Cleaning up the corresponding IP interface permanently means notifying an application 112 of a permanent disconnect with respect to that IP address 114 and cleaning up the internal state with respect to that IP address 114. Even when the wireless communication device 104 goes back to the source radio access technology (RAT) 106a, that IP address 114 can't be used again without the application 112 initiating a request and the wireless communication device 104 performing a new request to the network. This may be accomplished by using a dropped IP address timer 111 as discussed above in relation to FIG. 1.

In another configuration, when the Advanced Mobile Subscriber Software (AMSS) 108 discards an IP address 114, the IP address 114 is only considered discarded for the target radio access technology (RAT) 106b. The wireless communication device 104 may remember that the IP address 114 can still be used on the source radio access technology (RAT) 106a. The Advanced Mobile Subscriber Software (AMSS) 108 may notify the application 112 using the discarded IP address 114 of a temporary failure. If the wireless communication device 104 goes back to the source radio access technology (RAT) 106a where dual-IP bearers are supported, the wireless communication device 104 can use both IP addresses 114 again. The Advanced Mobile Subscriber Software (AMSS) 108 may notify the application 112 that the discarded IP address 114 is again useable. In this way, the connectivity for both IPv4 and IPv6 services may be reestablished. Enhancements are also provided for handling an IP address 114 when the wireless communication device 104 transitions from a radio access technology (RAT) 106 where the wireless communication device 104 does not support dual-IP bearer to another radio access technology (RAT) 106 where the wireless communication device 104 supports either dual-IP bearer (or two single address bearers to the same access point name (APN) 138).

When a wireless communication device 104 moves from a source radio access technology (RAT) 106a that does not support dual-IP bearer to a target radio access technology (RAT) 106b that supports dual-IP bearer, if the Packet Data Network (PDN) connection 110 is initiated by the wireless communication device 104, the wireless communication device 104 specifies the single IP address 114 it had in the source network and specifies that it is a handoff. Thus, the target network only needs to assign a new IP address 114 of the other type 116. When handing off to a target radio access technology (RAT) 106b that supports two single-IP bearers, the Packet Data Network (PDN) connection 110 is initiated by the wireless communication device 104 specifying the first IP address 114 as a handoff. Thus, the target network does not assign a new IP address 114 of that type 116. The second single-IP bearer may be initiated by the wireless communication device 104 if an application 112 requests a connection to the same access point name (APN) but for the other IP address 114 type 116.

Figure 8:
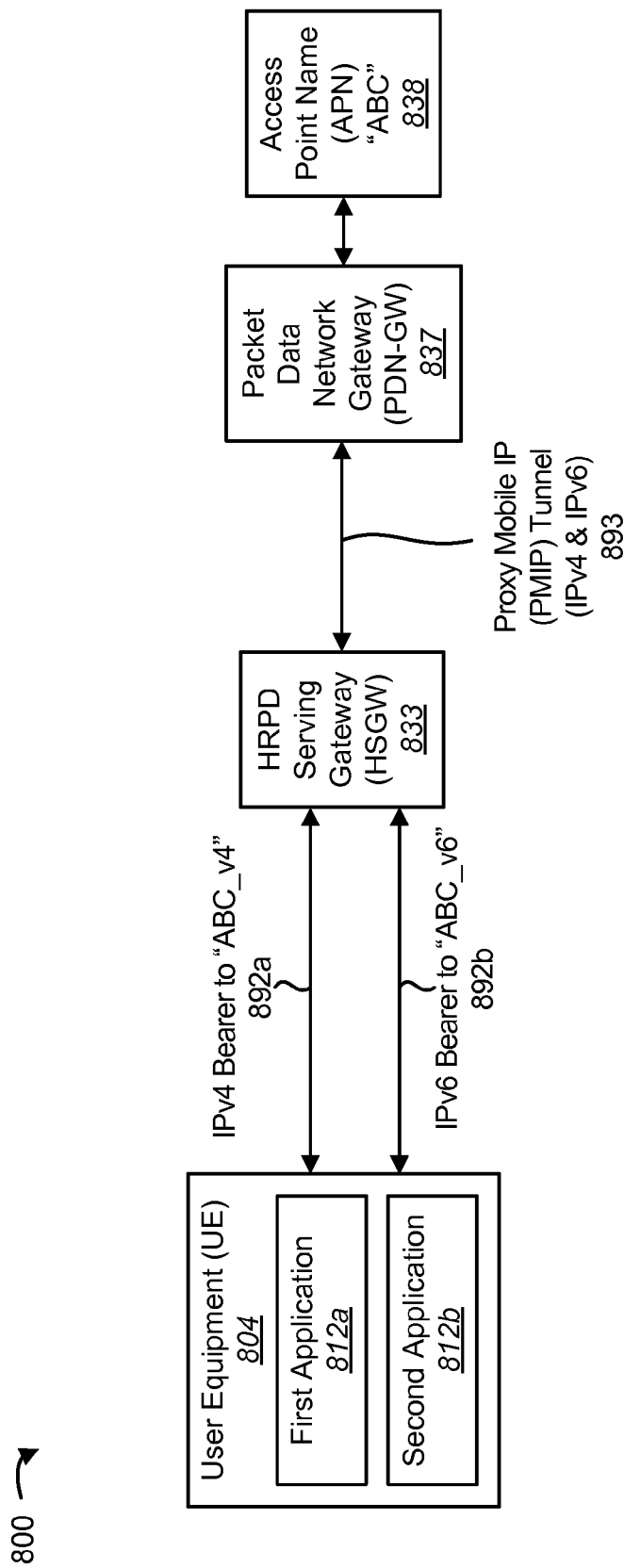
FIG. 8 is a block diagram illustrating IPv4 and IPv6 bearers mapped to a single Proxy Mobile IP (PMIP) tunnel.

FIG. 8 is a block diagram illustrating IPv4 and IPv6 bearers mapped to a single Proxy Mobile IP (PMIP) tunnel 893. The access point name (APN) 838 called "ABC" may provide both IPv4 and IPv6 services. There may be an understanding between the user equipment (UE) 804 and the HRPD Serving Gateway (HSGW) 833 that the user equipment (UE) 804 should use names "ABC_v4" and "ABC_v6" when the user equipment (UE) 804 wants to establish Packet Data Network (PDN) connections 110 to access v4 (using a first application 812a) and v6 (using a second application 812b) services respectively. The HRPD Serving Gateway (HSGW) 833, upon seeing these two Packet Data Network (PDN) connection 110 requests from the user equipment (UE) 804, knows that they both go to a single access point name (APN) 838 and thus maps both the Packet Data Network (PDN) connections 110 (i.e., the IPv4 bearer 892a to "ABC_v4" and the IPv6 bearer 892b to "ABC_v6") to a single Proxy Mobile IP (PMIP) tunnel 893 between the HRPD Serving Gateway (HSGW) 833 and the Packet Data Network Gateway (PDN-GW) 837.

Using this naming convention, only Scenario O-single from Table 3 above will take place, as far as the user equipment (UE) 804 is concerned. No software changes are required for legacy user equipments (UEs) 804 that do not support dual-IP bearers. Only the provisioning of access point name (APN) 838 names on the user equipments (UEs) 804 that do support dual-IP bearers have to follow the naming convention. However, the HRPD Serving Gateway (HSGW) 833 does require software that understands the naming convention used by the user equipments (UEs) 804 to map v4 and v6 to the same access point name (APN) 838 on the network side.

Instead of the access point name (APN) 838 names being provisioned by following the naming convention described above, the user equipment (UE) 804 software may be enhanced with the functionality of constructing the access point name (APN) 838 names from the application profiles by concatenating the access point name (APN) 838 name and IP address 114 type 116. For example, if an application 812 requests IPv6 service from the access point name (APN) 838 named "ABC," the user equipment (UE) 804 may construct the access point name (APN) 838 name as "ABC_v6."

Figure 9:
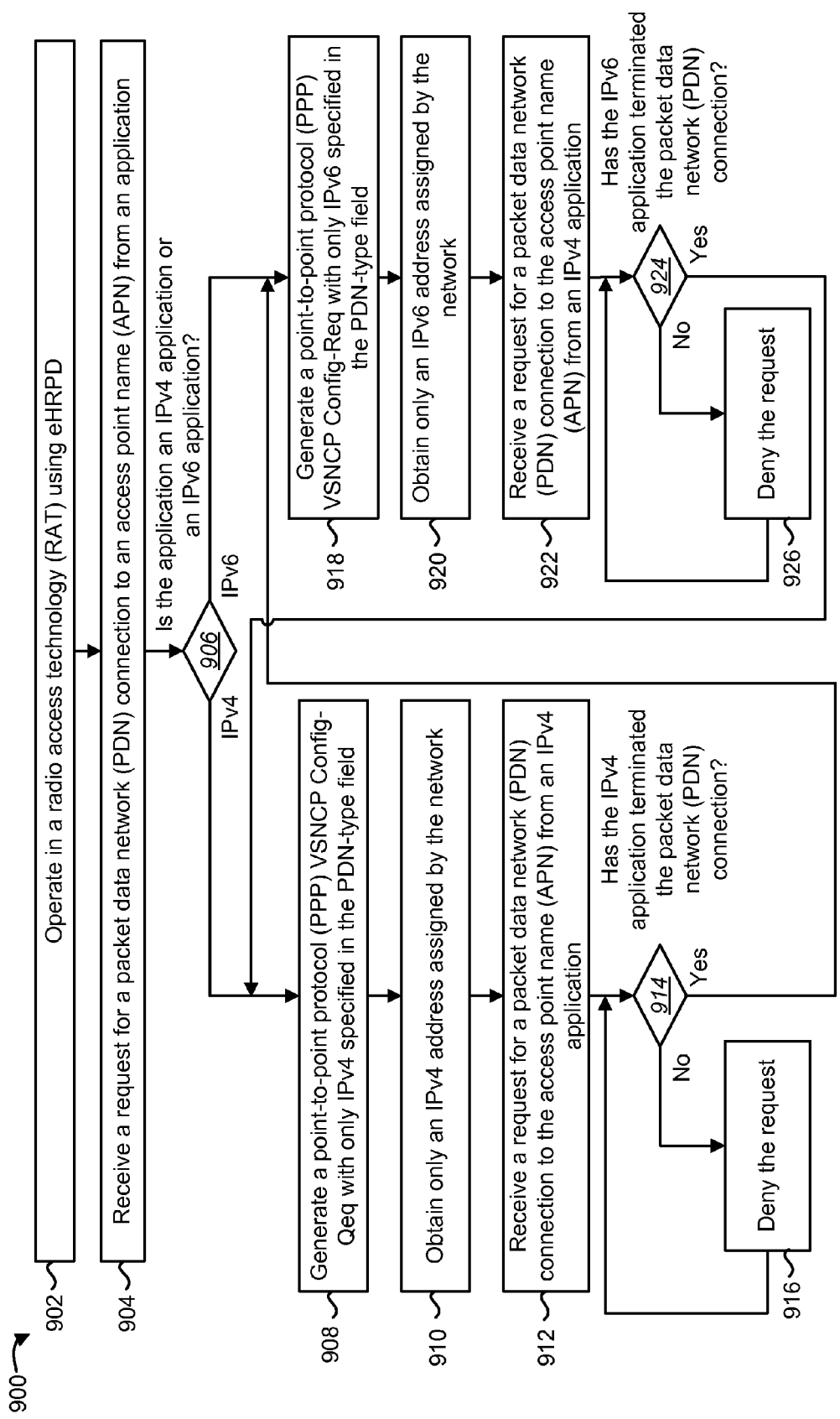
FIG. 9 is a flow diagram of a method for a wireless communication device to advertize capability to support only one IP address per Packet Data Network (PDN) connection.

FIG. 9 is a flow diagram of a method 900 for a wireless communication device 104 to advertize capability to support only one IP address 114 per Packet Data Network (PDN) connection 110. The method 900 may be performed by the wireless communication device 104. In one configuration, the method 900 may be performed by the Advanced Mobile Subscriber Software (AMSS) 108 on the wireless communication device 104. In this method 900, v4v6 is not used in the PDN Type field of the Point-to-Point Protocol (PPP) VSNCP Config-Req message in evolved High Rate Packet Data (eHRPD). The wireless communication device 104 may operate 902 in an evolved High Rate Packet Data (eHRPD) radio access technology (RAT) 106 where the wireless communication device 104 does not support dual-IP bearer. The wireless communication device 104 may receive 904 a request for a Packet Data Network (PDN) connection 110 to an access point name (APN) 138 from an application 112.

The wireless communication device 104 may determine 906 whether the application 112 is an IPv4 application or an IPv6 application. If the application 114 is an IPv4 application, the wireless communication device 104 may generate 908 a Point-to-Point Protocol (PPP) VSNCP Config-Req with only IPv4 specified in the PDN Type field. The wireless communication device 104 may then obtain 910 only an IPv4 address assigned by the network. When the wireless communication device 104 receives 912 a request for a Packet Data Network (PDN) connection 110 to the access point name (APN) 138 from an IPv6 application, the wireless communication device 104 may determine 914 whether the IPv4 application has terminated the Packet Data Network (PDN) connection 110. If the IPv4 application has not terminated the Packet Data Network (PDN) connection 110, the wireless communication device 104 may deny 916 the request from the IPv6 application. If the IPv4 application has terminated the Packet Data Network (PDN) connection 110, the wireless communication device 104 may generate 918 a Point-to-Point Protocol (PPP) VSNCP Config-Req with only IPv6 specified in the PDN Type field.

If the application 112 is an IPv6 application, the wireless communication device 104 may generate 918 a Point-to-Point Protocol (PPP) VSNCP Config-Req with only IPv6 specified in the PDN Type field. Once the wireless communication device 104 has generated 918 a Point-to-Point Protocol (PPP) VSNCP Config-Req with only IPv6 specified in the PDN Type field, the wireless communication device 104 may obtain 920 only an IPv6 address assigned by the network. When the wireless communication device 104 receives 922 a request for a Packet Data Network (PDN) connection 110 to the access point name (APN) 138 from an IPv4 application, the wireless communication device 104 may determine 924 whether the IPv6 application has terminated the Packet Data Network (PDN) connection 110. If the IPv6 application has not terminated the Packet Data Network (PDN) connection 110, the wireless communication device 104 may deny 926 the request from the IPv4 application. If the IPv6 application has terminated the Packet Data Network (PDN) connection 110, the wireless communication device 104 may generate 908 a Point-to-Point Protocol (PPP) VSNCP Config-Req with only IPv4 specified in the PDN Type field.

The Advanced Mobile Subscriber Software (AMSS) 108 may maintain a configurable lookup table for the IP address 114 type 116 per Packet Data Network (PDN) 110. If the application 112 requesting a Packet Data Network (PDN) connection 110 does not specify the IP address 114 preferences for the Packet Data Network (PDN) connection 110, the Advanced Mobile Subscriber Software (AMSS) 108 may specify the IP address 114 type 116 according to the lookup table. If dual-IP bearer is supported on Long Term Evolution (LTE) with two applications 112 running (one using IPv4 and one using IPv6) while the wireless communication device 104 is on Long Term Evolution (LTE), and the wireless communication device 104 moves from Long Term Evolution (LTE) to evolved High Rate Packet Data (eHRPD), the wireless communication device 104 should advertize only single IP address 114 capability in the PDN Type field. To determine which application 112 retains the connection, the method 700 discussed above in relation to FIG. 7 should be used.

Figure 10:
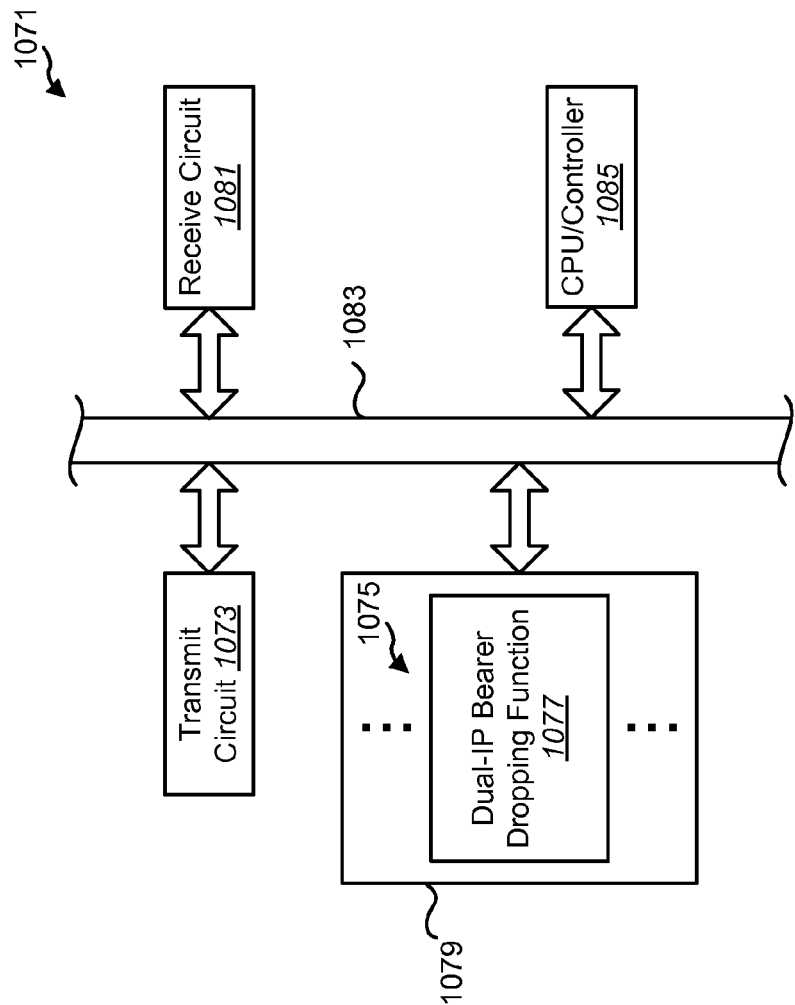
FIG. 10 shows part of a hardware implementation of an apparatus for executing the dual-IP bearer dropping methods described herein.

FIG. 10 shows part of a hardware implementation of an apparatus 1071 for executing the schemes or processes as described above. The apparatus 1071 comprises circuitry as described below. In this specification and the appended claims, it should be clear that the term "circuitry" is construed as a structural term and not as a functional term. For example, circuitry can be an aggregate of circuit components, such as a multiplicity of integrated circuit components, in the form of processing and/or memory cells, units, blocks and the like, such as shown and described in FIG. 10.

In this embodiment, the circuit apparatus is signified by the reference numeral 1071 and can be implemented in wireless communication device 104 or user equipment (UE) 204 described.

The apparatus 1071 comprises a central data bus 1083 linking several circuits together. The circuits include a CPU (Central Processing Unit) or a controller 1085, a receive circuit 1081, a transmit circuit 1073, and a memory unit 1079.

The receive circuit 1081 and the transmit circuit 1073 can be connected to an RF (Radio Frequency) circuit (which is not shown in the drawing). The receive circuit 1081 processes and buffers received signals before sending the signals out to the data bus 1083. On the other hand, the transmit circuit 1073 processes and buffers the data from the data bus 1083 before sending the data out of the device 1071. The CPU/controller 1085 performs the function of data management of the data bus 1083 and furthers the function of general data processing, including executing the instructional contents of the memory unit 1079.

The memory unit 1079 includes a set of modules and/or instructions generally signified by the reference numeral 1075. In this embodiment, the modules/instructions include, among other things, a dual-IP bearer dropping function 1077 which carries out the schemes and processes as described above. The function 1077 includes computer instructions or code for executing the process steps as shown and described in FIGS. 1-7. Specific instructions particular to an entity can be selectively implemented in the function 1077. For instance, if the apparatus 1071 is part of a wireless communication device 104, among other things, instructions particular to the wireless communication device 104, as shown and described in FIGS. 1-7 can be coded in the function 1077.

In this embodiment, the memory unit 1079 is a RAM (Random Access Memory) circuit. The exemplary functions, such as the function 1077, include one or more software routines, modules and/or data sets. The memory unit 1079 can be tied to another memory circuit (not shown) which can either be of the volatile or nonvolatile type. As an alternative, the memory unit 1079 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art.

Figure 11:
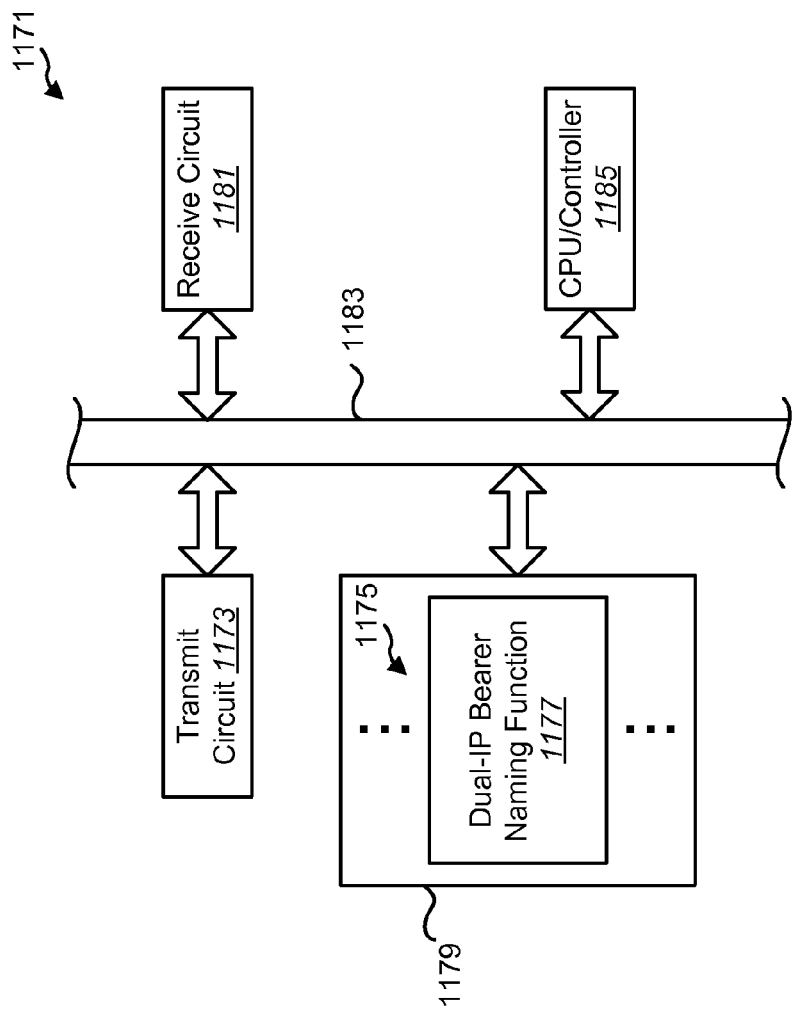
FIG. 11 shows part of a hardware implementation of an apparatus for executing the dual-IP bearer naming methods described herein.

FIG. 11 shows part of a hardware implementation of an apparatus 1171 for executing the schemes or processes as described above. The apparatus 1171 comprises circuitry as described below. In this specification and the appended claims, it should be clear that the term "circuitry" is construed as a structural term and not as a functional term. For example, circuitry can be an aggregate of circuit components, such as a multiplicity of integrated circuit components, in the form of processing and/or memory cells, units, blocks and the like, such as shown and described in FIG. 11.

In this embodiment, the circuit apparatus is signified by the reference numeral 1171 and can be implemented in a base station or an eNode B 324 described herein.

The apparatus 1171 comprises a central data bus 1183 linking several circuits together. The circuits include a CPU (Central Processing Unit) or a controller 1185, a receive circuit 1181, a transmit circuit 1173 and a memory unit 1179.

If the apparatus 1171 is part of a wireless device, the receive circuit 1181 and the transmit circuit 1173 can be connected to an RF (Radio Frequency) circuit (which is not shown in the drawing). The receive circuit 1181 processes and buffers received signals before sending the signals out to the data bus 1183. On the other hand, the transmit circuit 1173 processes and buffers the data from the data bus 1183 before sending the data out of the device 1171. The CPU/controller 1185 performs the function of data management of the data bus 1183 and further the function of general data processing, including executing the instructional contents of the memory unit 1179.

The memory unit 1179 includes a set of modules and/or instructions generally signified by the reference numeral 1175. In this embodiment, the modules/instructions include, among other things, a dual-IP bearer naming function 1177 which carries out the schemes and processes as described above. The function 1177 includes computer instructions or code for executing the process steps as shown and described in FIGS. 1, 3, 8 and/or 9. Specific instructions particular to an entity can be selectively implemented in the function 1177. For instance, if the apparatus 1171 is part of an eNode B 324, among other things, instructions particular to the eNode B 324 as shown and described in FIGS. 2, 8 and 9 can be coded in the function 1177.

In this embodiment, the memory unit 1179 is a RAM (Random Access Memory) circuit. The exemplary functions, such as the function 1177, include one or more software routines, modules and/or data sets. The memory unit 1179 can be tied to another memory circuit (not shown) which can either be of the volatile or nonvolatile type. As an alternative, the memory unit 1179 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer or processor. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL) or wireless technologies such as infrared, radio and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus operable in a communication system, comprising:
   means for receiving an assignment of a first internet protocol address of a first type for a first application and a second internet protocol address of a second type for a second application for a data connection to a network;
   means for determining that the apparatus is currently not able to handle both the first internet protocol address and the second internet protocol address;
   means for determining an internet protocol address to discard; and
   means for discarding the determined internet protocol address.

2. The apparatus of claim 1, wherein the data connection is a packet data network connection.

3. The apparatus of claim 1, wherein the network is an access point name.

4. The apparatus of claim 1, wherein the first internet protocol address is an IPv4 address and the second internet protocol address in an IPv6 address.

5. The apparatus of claim 1, wherein the means for determining an internet protocol address to discard comprise means for determining that an application requesting the data connection also requested an internet protocol address type.

6. The apparatus of claim 5, wherein the application requesting the data connection requested an IPv4 address, wherein the determined internet protocol address is an IPv6 address and further comprising means for retaining the IPv4 address.

7. The apparatus of claim 5, wherein the application requesting the data connection requested an IPv6 address, wherein the determined internet protocol address is an IPv4 address and further comprising means for retaining the IPv6 address.

8. The apparatus of claim 1, wherein the means for determining an internet protocol address to discard comprises:
   means for determining that an application requesting the data connection did not request an internet protocol address type; and
   means for determining whether an operator has specified an internet protocol address type to be retained.

9. The apparatus of claim 8, wherein the operator has specified that an IPv4 address is to be retained, wherein the determined internet protocol address is an IPv6 address and further comprising means for retaining the IPv4 address.

10. The apparatus of claim 8, wherein the operator has specified that an IPv6 address is to be retained, wherein the determined internet protocol address is an IPv4 address and further comprising means for retaining the IPv6 address.

11. The apparatus of claim 1, wherein the means for determining that the apparatus is currently not able to handle both the first internet protocol address and the second internet protocol address comprises means for switching from an access point name in a first radio access technology to the access point name in a second radio access technology, wherein the apparatus is capable of handling both the first internet protocol address and the second internet protocol address in the first radio access technology but not in the second radio access technology.

12. The apparatus of claim 11, wherein the means for determining an internet protocol address to discard comprise means for determining whether the first internet protocol address and the second internet protocol address are throttled.

13. The apparatus of claim 12, wherein both the first internet protocol address and the second internet protocol address are throttled, and wherein the means for determining an internet protocol address to discard further comprise:
  means for blocking the first internet protocol address and the second internet protocol address until a throttling timer expires; and
  means for determining whether an internet protocol address quality of service is configured for the first application and the second application.

14. The apparatus of claim 13, wherein the internet protocol address quality of service is configured for only the first application, and wherein the second internet protocol address is the determined internet protocol address to discard.

15. The apparatus of claim 13, wherein the internet protocol address quality of service is configured for only the second application, and wherein the first internet protocol address is the determined internet protocol address to discard.

16. The apparatus of claim 12, wherein neither the first internet protocol address nor the second internet protocol address is throttled, and wherein the means for determining an internet protocol address to discard further comprise means for determining whether an internet protocol address quality of service is configured for the first application and the second application.

17. The apparatus of claim 16, wherein the internet protocol quality of service is configured for neither the first application nor the second application, and wherein the means for determining an internet protocol address to discard further comprise means for determining whether an inactivity time of the first application and an inactivity time of the second application are both greater than an inactivity threshold.

18. The apparatus of claim 16, wherein the internet protocol quality of service is configured for both the first application and the second application, and wherein the means for determining an internet protocol address to discard further comprise means for determining whether an inactivity time of the first application and an inactivity time of the second application are both greater than an inactivity threshold.

19. The apparatus of claim 18, wherein the inactivity time of the first application and the inactivity time of the second application are both greater than the inactivity threshold, and wherein the means for determining an internet protocol address to discard further comprise means for determining whether an operator has specified an internet protocol address type to be retained.

20. The apparatus of claim 19, wherein the operator has specified that an IPv4 address is to be retained, wherein the determined internet protocol address to discard is an IPv6 address, and further comprising means for retaining the IPv4 address.

21. The apparatus of claim 19, wherein the operator has specified that an IPv6 address is to be retained, wherein the determined internet protocol address to discard is an IPv4 address, and further comprising means for retaining the IPv6 address.

22. The apparatus of claim 19, wherein the operator has not specified an internet protocol address type to be retained, wherein the determined internet protocol address to discard is an IPv4 address, and further comprising means for retaining an IPv6 address.

23. The apparatus of claim 18, wherein the inactivity time of the first application and the inactivity time of the second application are not both greater than the inactivity threshold, and wherein the means for determining an internet protocol address to discard further comprise means for determining which application was most recently involved in data transfer.

24. The apparatus of claim 23, wherein the first application was most recently involved in data transfer, and wherein the second internet protocol address is the determined internet protocol address to discard.

25. The apparatus of claim 23, wherein the second application was most recently involved in data transfer, and wherein the first internet protocol address is the determined internet protocol address to discard.

26. The apparatus of claim 12, wherein only the first internet protocol address for the first application is throttled, and wherein the first internet protocol address is the determined internet protocol address to discard.

27. The apparatus of claim 12, wherein only the second internet protocol address for the second application is throttled, and wherein the second internet protocol address is the determined internet protocol address to discard.

28. The apparatus of claim 11, wherein the first radio access technology is Long Term Evolution and the second radio access technology is evolved High Rate Packet Data.

29. The apparatus of claim 11, further comprising:
  means for starting a dropped internet protocol address timer when the apparatus switches from the first radio access technology to the second radio access technology;
  means for storing the determined internet protocol address to discard; and
  means for reusing the determined internet protocol address to discard if the apparatus returns to the first radio access technology prior to the expiration of the dropped internet protocol address timer.

30. An apparatus, comprising:
  circuitry configured to receive an assignment of a first internet protocol address of a first type for a first application and a second internet protocol address of a second type for a second application for a data connection to a network, determine that the apparatus is currently not able to handle both the first internet protocol address and the second internet protocol address, determine an internet protocol address to discard, and discard the determined internet protocol address.

31. The apparatus of claim 30, wherein the data connection is a packet data network connection.

32. The apparatus of claim 30, wherein the network is an access point name.

33. The apparatus of claim 30, wherein the first internet protocol address is an IPv4 address and the second internet protocol address in an IPv6 address.

34. The apparatus of claim 30, wherein the circuitry configured to determine an internet protocol address to discard comprises circuitry configured to determine that an application requesting the data connection also requested an internet protocol address type.

35. The apparatus of claim 34, wherein the application requesting the data connection requested an IPv4 address, wherein the determined internet protocol address is an IPv6 address and further comprising circuitry configured to retain the IPv4 address.

36. The apparatus of claim 34, wherein the application requesting the data connection requested an IPv6 address, wherein the determined internet protocol address is an IPv4 address and further comprising circuitry configured to retain the IPv6 address.

37. The apparatus of claim 30, wherein the circuitry configured to determine an internet protocol address to discard comprises circuitry configured to determine that an application requesting the data connection did not request an internet protocol address type and determine whether an operator has specified an internet protocol address type to be retained.

38. The apparatus of claim 37, wherein the operator has specified that an IPv4 address is to be retained, wherein the determined internet protocol address is an IPv6 address and wherein the circuitry is further configured to retain the IPv4 address.

39. The apparatus of claim 37, wherein the operator has specified that an IPv6 address is to be retained, wherein the determined internet protocol address is an IPv4 address and wherein the circuitry is further configured to retain the IPv6 address.

40. The apparatus of claim 30, wherein the circuitry configured to determine that the apparatus is currently not able to handle both the first internet protocol address and the second internet protocol address comprises circuitry configured to switch from an access point name in a first radio access technology to the access point name in a second radio access technology, wherein the apparatus is capable of handling both the first internet protocol address and the second internet protocol address in the first radio access technology but not in the second radio access technology.

41. The apparatus of claim 40, wherein the circuitry configured to determine an internet protocol address to discard comprise circuitry configured to determine whether the first internet protocol address and the second internet protocol address are throttled.

42. The apparatus of claim 41, wherein both the first internet protocol address and the second internet protocol address are throttled, and wherein the circuitry configured to determine an internet protocol address to discard further comprises circuitry configured to block the first internet protocol address and the second internet protocol address until a throttling timer expires and determine whether an internet protocol address quality of service is configured for the first application and the second application.

43. The apparatus of claim 42, wherein the internet protocol address quality of service is configured for only the first application, and wherein the second internet protocol address is the determined internet protocol address to discard.

44. The apparatus of claim 42, wherein the internet protocol address quality of service is configured for only the second application, and wherein the first internet protocol address is the determined internet protocol address to discard.

45. The apparatus of claim 41, wherein neither the first internet protocol address nor the second internet protocol address is throttled, and wherein the circuitry configured to determine an internet protocol address to discard further comprises circuitry configured to determine whether an internet protocol address quality of service is configured for the first application and the second application.

46. The apparatus of claim 45, wherein the internet protocol quality of service is configured for neither the first application nor the second application, and wherein the circuitry configured to determine an internet protocol address to discard further comprises circuitry configured to determine whether an inactivity time of the first application and an inactivity time of the second application are both greater than an inactivity threshold.

47. The apparatus of claim 45, wherein the internet protocol quality of service is configured for both the first application and the second application, and wherein the circuitry configured to determine an internet protocol address to discard further comprises circuitry configured to determine whether an inactivity time of the first application and an inactivity time of the second application are both greater than an inactivity threshold.

48. The apparatus of claim 47, wherein the inactivity time of the first application and the inactivity time of the second application are both greater than the inactivity threshold, and wherein the circuitry configured to determine an internet protocol address to discard further comprises circuitry configured to determine whether an operator has specified an internet protocol address type to be retained.

49. The apparatus of claim 48, wherein the operator has specified that an IPv4 address is to be retained, wherein the determined internet protocol address to discard is an IPv6 address, and wherein the circuitry is further configured to retain the IPv4 address.

50. The apparatus of claim 48, wherein the operator has specified that an IPv6 address is to be retained, wherein the determined internet protocol address to discard is an IPv4 address, and wherein the circuitry is further configured to retain the IPv6 address.

51. The apparatus of claim 48, wherein the operator has not specified an internet protocol address type to be retained, wherein the determined internet protocol address to discard is an IPv4 address, and wherein the circuitry is further configured to retain an IPv6 address.

52. The apparatus of claim 47, wherein the inactivity time of the first application and the inactivity time of the second application are not both greater than the inactivity threshold, and wherein the circuitry configured to determine an internet protocol address to discard further comprises circuitry configured to determine which application was most recently involved in data transfer.

53. The apparatus of claim 52, wherein the first application was most recently involved in data transfer, and wherein the second internet protocol address is the determined internet protocol address to discard.

54. The apparatus of claim 52, wherein the second application was most recently involved in data transfer, and wherein the first internet protocol address is the determined internet protocol address to discard.

55. The apparatus of claim 41, wherein only the first internet protocol address for the first application is throttled, and wherein the first internet protocol address is the determined internet protocol address to discard.

56. The apparatus of claim 41, wherein only the second internet protocol address for the second application is throttled, and wherein the second internet protocol address is the determined internet protocol address to discard.

57. The apparatus of claim 40, wherein the first radio access technology is Long Term Evolution and the second radio access technology is evolved High Rate Packet Data.

58. The apparatus of claim 40, wherein the circuitry is further configured to start a dropped internet protocol address timer when the apparatus switches from the first radio access technology to the second radio access technology, store the determined internet protocol address to discard and reuse the determined internet protocol address to discard if the apparatus returns to the first radio access technology prior to the expiration of the dropped internet protocol address timer.

59. A method operable by a wireless communication device, comprising:

receiving an assignment of a first internet protocol address of a first type for a first application and a second internet protocol address of a second type for a second application for a data connection to a network;

determining that the wireless communication device is currently not able to handle both the first internet protocol address and the second internet protocol address;

determining an internet protocol address to discard; and discarding the determined internet protocol address.

60. The method of claim 59, wherein the data connection is a packet data network connection.

61. The method of claim 59, wherein the network is an access point name.

62. The method of claim 59, wherein the first internet protocol address is an IPv4 address and the second internet protocol address in an IPv6 address.

63. The method of claim 59, wherein determining an internet protocol address to discard comprises determining that an application requesting the data connection also requested an internet protocol address type.

64. The method of claim 63, wherein the application requesting the data connection requested an IPv4 address, wherein the determined internet protocol address is an IPv6 address and further comprising retaining the IPv4 address.

65. The method of claim 63, wherein the application requesting the data connection requested an IPv6 address, wherein the determined internet protocol address is an IPv4 address and further comprising retaining the IPv6 address.

66. The method of claim 59, wherein determining an internet protocol address to discard comprises:

determining that an application requesting the data connection did not request an internet protocol address type; and determining whether an operator has specified an internet protocol address type to be retained.

67. The method of claim 66, wherein the operator has specified that an IPv4 address is to be retained, wherein the determined internet protocol address is an IPv6 address and further comprising retaining the IPv4 address.

68. The method of claim 66, wherein the operator has specified that an IPv6 address is to be retained, wherein the determined internet protocol address is an IPv4 address and further comprising retaining the IPv6 address.

69. The method of claim 59, wherein determining that the wireless communication device is currently not able to handle both the first internet protocol address and the second internet protocol address comprises switching from an access point name in a first radio access technology to the access point name in a second radio access technology, wherein the wireless communication device is capable of handling both the first internet protocol address and the second internet protocol address in the first radio access technology but not in the second radio access technology.

70. The method of claim 69, wherein determining an internet protocol address to discard comprises determining whether the first internet protocol address and the second internet protocol address are throttled.

71. The method of claim 70, wherein both the first internet protocol address and the second internet protocol address are throttled, and wherein determining an internet protocol address to discard further comprises:

blocking the first internet protocol address and the second internet protocol address until a throttling timer expires; and determining whether an internet protocol address quality of service is configured for the first application and the second application.

72. The method of claim 71, wherein the internet protocol address quality of service is configured for only the first application, and wherein the second internet protocol address is the determined internet protocol address to discard.

73. The method of claim 71, wherein the internet protocol address quality of service is configured for only the second application, and wherein the first internet protocol address is the determined internet protocol address to discard.

74. The method of claim 70, wherein neither the first internet protocol address nor the second internet protocol address is throttled, and wherein determining an internet protocol address to discard further comprises determining whether an internet protocol address quality of service is configured for the first application and the second application.

75. The method of claim 74, wherein the internet protocol quality of service is configured for neither the first application nor the second application, and wherein determining an internet protocol address to discard further comprises determining whether an inactivity time of the first application and an inactivity time of the second application are both greater than an inactivity threshold.

76. The method of claim 74, wherein the internet protocol quality of service is configured for both the first application and the second application, and wherein determining an internet protocol address to discard further comprises determining whether an inactivity time of the first application and an inactivity time of the second application are both greater than an inactivity threshold.

77. The method of claim 76, wherein the inactivity time of the first application and the inactivity time of the second application are both greater than the inactivity threshold, and wherein determining an internet protocol address to discard further comprises determining whether an operator has specified an internet protocol address type to be retained.

78. The method of claim 77, wherein the operator has specified that an IPv4 address is to be retained, wherein the determined internet protocol address to discard is an IPv6 address, and further comprising retaining the IPv4 address.

79. The method of claim 77, wherein the operator has specified that an IPv6 address is to be retained, wherein the determined internet protocol address to discard is an IPv4 address, and further comprising retaining the IPv6 address.

80. The method of claim 77, wherein the operator has not specified an internet protocol address type to be retained, wherein the determined internet protocol address to discard is an IPv4 address, and further comprising retaining an IPv6 address.

81. The method of claim 76, wherein the inactivity time of the first application and the inactivity time of the second application are not both greater than the inactivity threshold, and wherein determining an internet protocol address to discard further comprises determining which application was most recently involved in data transfer.

82. The method of claim 81, wherein the first application was most recently involved in data transfer, and wherein the second internet protocol address is the determined internet protocol address to discard.

83. The method of claim 81, wherein the second application was most recently involved in data transfer, and wherein the first internet protocol address is the determined internet protocol address to discard.

84. The method of claim 70, wherein only the first internet protocol address for the first application is throttled, and wherein the first internet protocol address is the determined internet protocol address to discard.

85. The method of claim 70, wherein only the second internet protocol address for the second application is throttled, and wherein the second internet protocol address is the determined internet protocol address to discard.

86. The method of claim 69, wherein the first radio access technology is Long Term Evolution and the second radio access technology is evolved High Rate Packet Data.

87. The method of claim 69, further comprising:
   starting a dropped internet protocol address timer when the wireless communication device switches from the first radio access technology to the second radio access technology;
   storing the determined internet protocol address to discard; and
   reusing the determined internet protocol address to discard if the wireless communication device returns to the first radio access technology prior to the expiration of the dropped internet protocol address timer.

88. A computer-program product operable in a communication system, the computer-program product comprising a non-transitory tangible computer-readable medium having instructions thereon, the instructions comprising:
   code for causing an apparatus to receive an assignment of a first internet protocol address of a first type for a first application and a second internet protocol address of a second type for a second application for a data connection to a network;
   code for causing the apparatus to determine that the apparatus is currently not able to handle both the first internet protocol address and the second internet protocol address;
   code for causing the apparatus to determine an internet protocol address to discard; and
   code for causing the apparatus to discard the determined internet protocol address.

89. The computer-program product of claim 88, wherein the data connection is a packet data network connection.

90. The computer-program product of claim 88, wherein the network is an access point name.

91. The computer-program product of claim 88, wherein the first internet protocol address is an IPv4 address and the second internet protocol address in an IPv6 address.

92. The computer-program product of claim 88, wherein the code for causing the apparatus to determine an internet protocol address to discard comprises code for causing the apparatus to determine that an application requesting the data connection also requested an internet protocol address type.

93. The computer-program product of claim 92, wherein the application requesting the data connection requested an IPv4 address, wherein the determined internet protocol address is an IPv6 address and wherein the instructions further comprise code for causing the apparatus to retain the IPv4 address.

94. The computer-program product of claim 92, wherein the application requesting the data connection requested an IPv6 address, wherein the determined internet protocol address is an IPv4 address and wherein the instructions further comprise code for causing the apparatus to retain the IPv6 address.

95. The computer-program product of claim 88, wherein the code for causing the apparatus to determine an internet protocol address to discard comprises:
   code for causing the apparatus to determine that an application requesting the data connection did not request an internet protocol address type; and
   code for causing the apparatus to determine whether an operator has specified an internet protocol address type to be retained.

96. The computer-program product of claim 95, wherein the operator has specified that an IPv4 address is to be retained, wherein the determined internet protocol address is an IPv6 address and wherein the instructions further comprise code for causing the apparatus to retain the IPv4 address.

97. The computer-program product of claim 95, wherein the operator has specified that an IPv6 address is to be retained, wherein the determined internet protocol address is an IPv4 address, and wherein the instructions further comprise code for causing the apparatus to retain the IPv6 address.

98. The computer-program product of claim 88, wherein the code for causing the apparatus to determine that the apparatus is currently not able to handle both the first internet protocol address and the second internet protocol address comprises code for causing the apparatus to switch from an access point name in a first radio access technology to the access point name in a second radio access technology, wherein the apparatus is capable of handling both the first internet protocol address and the second internet protocol address in the first radio access technology but not in the second radio access technology.

99. The computer-program product of claim 98, wherein the code for causing the apparatus to determine an internet protocol address to discard comprise code for causing the apparatus to determine whether the first internet protocol address and the second internet protocol address are throttled.

100. The computer-program product of claim 99, wherein both the first internet protocol address and the second internet protocol address are throttled, and wherein the code for causing the apparatus to determine an internet protocol address to discard further comprises:
   code for causing the apparatus to block the first internet protocol address and the second internet protocol address until a throttling timer expires; and
   code for causing the apparatus to determine whether an internet protocol address quality of service is configured for the first application and the second application.

101. The computer-program product of claim 100, wherein the internet protocol address quality of service is configured for only the first application, and wherein the second internet protocol address is the determined internet protocol address to discard.

102. The computer-program product of claim 100, wherein the internet protocol address quality of service is configured for only the second application, and wherein the first internet protocol address is the determined internet protocol address to discard.

103. The computer-program product of claim 99, wherein neither the first internet protocol address nor the second internet protocol address is throttled, and wherein the code for causing the apparatus to determine an internet protocol address to discard further comprises code for causing the apparatus to determine whether an internet protocol address quality of service is configured for the first application and the second application.

104. The computer-program product of claim 103, wherein the internet protocol quality of service is configured for neither the first application nor the second application, and wherein the code for causing the apparatus to determine an internet protocol address to discard further comprises code for causing the apparatus to determine whether an inactivity time of the first application and an inactivity time of the second application are both greater than an inactivity threshold.

105. The computer-program product of claim 103, wherein the internet protocol quality of service is configured for both the first application and the second application, and wherein the code for causing the apparatus to determining an internet protocol address to discard further comprises code for causing the apparatus to determine whether an inactivity time of the first application and an inactivity time of the second application are both greater than an inactivity threshold.

106. The computer-program product of claim 105, wherein the inactivity time of the first application and the inactivity time of the second application are both greater than the inactivity threshold, and wherein the code for causing the apparatus to determine an internet protocol address to discard further comprises code for causing the apparatus to determine whether an operator has specified an internet protocol address type to be retained.

107. The computer-program product of claim 106, wherein the operator has specified that an IPv4 address is to be retained, wherein the determined internet protocol address to discard is an IPv6 address, and wherein the instructions further comprise code for causing the apparatus to retain the IPv4 address.

108. The computer-program product of claim 106, wherein the operator has specified that an IPv6 address is to be retained, wherein the determined internet protocol address to discard is an IPv4 address, and wherein the instructions further comprise code for causing the apparatus to retain the IPv6 address.

109. The computer-program product of claim 106, wherein the operator has not specified an internet protocol address type to be retained, wherein the determined internet protocol address to discard is an IPv4 address, and wherein the instructions further comprise code for causing the apparatus to retain an IPv6 address.

110. The computer-program product of claim 105, wherein the inactivity time of the first application and the inactivity time of the second application are not both greater than the inactivity threshold, and wherein the code for causing the apparatus to determine an internet protocol address to discard further comprises code for causing the apparatus to determine which application was most recently involved in data transfer.

111. The computer-program product of claim 110, wherein the first application was most recently involved in data transfer, and wherein the second internet protocol address is the determined internet protocol address to discard.

112. The computer-program product of claim 110, wherein the second application was most recently involved in data transfer, and wherein the first internet protocol address is the determined internet protocol address to discard.

113. The computer-program product of claim 99, wherein only the first internet protocol address for the first application is throttled, and wherein the first internet protocol address is the determined internet protocol address to discard.

114. The computer-program product of claim 99, wherein only the second internet protocol address for the second application is throttled, and wherein the second internet protocol address is the determined internet protocol address to discard.

115. The computer-program product of claim 98, wherein the first radio access technology is Long Term Evolution and the second radio access technology is evolved High Rate Packet Data.

116. The computer-program product of claim 98, wherein the instructions further comprise:
- code for causing the apparatus to start a dropped internet protocol address timer when the apparatus switches from the first radio access technology to the second radio access technology;
- code for causing the apparatus to store the determined internet protocol address to discard; and
- code for causing the apparatus to reuse the determined internet protocol address to discard if the apparatus returns to the first radio access technology prior to the expiration of the dropped internet protocol address timer.

* * * * *